US007970609B2

(12) United States Patent
Hayakawa

(10) Patent No.: US 7,970,609 B2
(45) Date of Patent: Jun. 28, 2011

(54) METHOD OF ESTIMATING SOUND ARRIVAL DIRECTION, SOUND ARRIVAL DIRECTION ESTIMATING APPARATUS, AND COMPUTER PROGRAM PRODUCT

(75) Inventor: Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 954 days.

(21) Appl. No.: 11/878,038

(22) Filed: Jul. 20, 2007

(65) Prior Publication Data

US 2008/0040101 A1 Feb. 14, 2008

(30) Foreign Application Priority Data

Aug. 9, 2006 (JP) ................................ 2006-217293
Feb. 14, 2007 (JP) ................................ 2007-033911

(51) Int. Cl.
*G10L 15/00* (2006.01)
(52) U.S. Cl. ...................................................... 704/238
(58) Field of Classification Search .................. 704/205, 704/238, 211, 226
See application file for complete search history.

(56) References Cited

U.S. PATENT DOCUMENTS

| | | | | |
|---|---|---|---|---|
| 5,452,398 | A | 9/1995 | Yamada et al. | 395/232 |
| 6,339,758 | B1 * | 1/2002 | Kanazawa et al. | 704/226 |
| 6,363,345 | B1 * | 3/2002 | Marash et al. | 704/226 |
| 7,720,679 | B2 * | 5/2010 | Ichikawa et al. | 704/233 |
| 2003/0147538 | A1 * | 8/2003 | Elko | 381/92 |
| 2005/0096904 | A1 * | 5/2005 | Taniguchi et al. | 704/226 |
| 2007/0005350 | A1 * | 1/2007 | Amada | 704/211 |

FOREIGN PATENT DOCUMENTS

| | | |
|---|---|---|
| JP | 05-307399 | 11/1993 |
| JP | 2003-337164 | 11/2003 |
| JP | 2004-12151 | 1/2004 |
| JP | 2004-325284 | 11/2004 |

OTHER PUBLICATIONS

Chinese Office Action mailed Mar. 16, 2010 with English translation ( 20 pages).

* cited by examiner

*Primary Examiner* — Jakieda R Jackson
(74) *Attorney, Agent, or Firm* — Fujitsu Patent Center

(57) ABSTRACT

Sound signals from sound sources present in multiple directions are accepted as inputs of multiple channels, and signal of each channel is transformed into a signal on a frequency axis. A phase component of the transformed signal is calculated for each identical frequency, and phase difference between the multiple channels is calculated. An amplitude component of the transformed signal is calculated, and a noise component is estimated from the calculated amplitude component. An SN ratio for each frequency is calculated on the basis of the amplitude component and the estimated noise component, and frequencies at which the SN ratios are larger than a predetermined value are extracted. Difference between arrival distances is calculated on the basis of the phase difference at selected frequency, and the arrival direction in which it is estimated that the target sound source is present is calculated.

20 Claims, 10 Drawing Sheets

METHOD OF ESTIMATING SOUND ARRIVAL DIRECTION, SOUND ARRIVAL DIRECTION ESTIMATING APPARATUS, AND COMPUTER PROGRAM PRODUCT

CROSS-REFERENCE TO RELATED APPLICATIONS

This Nonprovisional application claims priority under 35 U.S.C. §119(a) on Japanese Patent Application No. 2006-217293 filed in Japan on Aug. 9, 2006 and Japanese Patent Application No. 2007-33911 filed in Japan on Feb. 14, 2007, the entire contents of which are hereby incorporated by reference.

BACKGROUND OF THE INVENTION

1. Field of the Invention

The present invention relates to a method of estimating sound arrival direction capable of accurately estimating the arrival direction of sound input from a sound source using multiple microphones even if ambient noise is present. The present invention further relates to a sound arrival direction estimating apparatus for carrying out the above-mentioned method, and a computer program product for achieving the above-mentioned apparatus using a general purpose computer.

2. Description of Related Art

Thanks to the progress of computer technology in recent years, even sound signal processing requiring a large amount of operation processing has become able to be carried out at a practical processing speed. Under these circumstances, a multi-channel sound processing function that uses multiple microphones is expected to come into practical use. A sound arrival direction estimating process for estimating the arrival direction of a sound signal is used as an example thereof. The sound arrival direction estimating process is a process for obtaining the delay time when a sound signal from a target sound source arrives at two of multiple microphones installed apart from each other with an interval and for estimating the arrival direction of the sound signal from the sound source on the basis of the difference between the arrival distances from the microphones and the installation interval between the microphones.

In a conventional sound arrival direction estimating process, for example, the correlation between signals inputted from two microphones is calculated, and the delay time between the two signals, at which the correlation becomes maximum, is calculated. Because the difference between the arrival distances is obtained by multiplying the calculated delay time by the transmission speed of sound in the air at the normal temperature, 340 m/s (changing according to the temperature), the arrival direction of the sound signal is calculated from the installation interval of the microphones using trigonometry.

Furthermore, as disclosed in Japanese Patent Application Laid-Open No. 2003-337164, it is possible that the phase difference spectrum for each of the frequencies of the sound signals inputted from two microphones is calculated, and the arrival direction of the sound signal from a sound source is calculated on the basis of the inclination of the phase difference spectrum in the case that linear-approximation is carried out on frequency domain.

BRIEF SUMMARY OF THE INVENTION

In the conventional method of estimating sound arrival direction described above, in the case that noise is superimposed, the noise makes it difficult to specify the time (delay) at which the correlation becomes maximum. This causes a problem in which it is difficult to properly specify the arrival direction of the sound signal from a sound source. Furthermore, even in the method disclosed in Japanese Patent Application Laid-Open No. 2003-337164, at calculating of a phase difference spectrum, when noise is superimposed, the phase difference spectrum changes significantly, and the change causes a problem in which the inclination of the phase difference spectrum cannot be obtained accurately.

In view of the circumstances described above, the present invention is intended to provide a method of estimating sound arrival direction, a sound arrival direction estimating apparatus, and a computer program product, capable of accurately estimating the arrival direction of the sound signal from a target sound source even if ambient noise is present around microphones.

For the purpose of attaining the above-mentioned objects, a first aspect of a method of estimating sound arrival direction according to the present invention is a method of estimating direction in which a sound source of sound signal is present, the sound signal being inputted to sound signal input units for inputting sound signals from the sound sources present in multiple directions as inputs of multiple channels, and is characterized by comprising the steps of: accepting inputs of multiple channels inputted by the sound signal input units and converting each signal into a signal on a time axis for each channel; transforming the signal of each channel on the time axis into a signal on a frequency axis; calculating a phase component of the transformed signal of each channel on the frequency axis for each identical frequency; calculating phase difference between the multiple channels using the phase component of the signal of each channel, calculated for each identical frequency; calculating an amplitude component of the transformed signal on the frequency axis; estimating a noise component from the calculated amplitude component; calculating a signal-to-noise ratio for each frequency on the basis of the calculated amplitude component and the estimated noise component; extracting frequencies at which the signal-to-noise ratios are larger than a predetermined value; calculating difference between arrival distances of the sound signal from a target sound source on the basis of the calculated phase difference of the extracted frequencies; and estimating direction in which a target sound source is present on the basis of the calculated difference between the arrival distances.

In addition, a first aspect of a sound arrival direction estimating apparatus according to the present invention is a sound arrival direction estimating apparatus for estimating direction in which a sound source of sound signal is present, the sound signal being inputted to sound signal inputting parts which input sound signals from the sound sources present in multiple directions as inputs of multiple channels, and is characterized by comprising: sound signal accepting part which accepts sound signals of multiple channels inputted by the sound signal inputting parts and converting each signal into a signal on a time axis for each channel; signal transforming part which transforms the signal on the time axis, converted by the sound signal accepting part, into a signal on a frequency axis for each channel; phase component calculating part which calculates for each identical frequency a phase component of the signal of each channel on the frequency axis transformed by the signal transforming part; phase difference calculating part which calculates phase difference between the multiple channels using the phase component of the signal of each channel, calculated for each identical frequency by the phase component calculating part; amplitude component calculating part which calculates an amplitude component of the signal on the frequency axis transformed by the signal transforming part; noise component estimating part which estimates a noise component from the amplitude component calculated by the amplitude component calculating part; signal-to-noise ratio calculating part which calculates a signal-to-noise ratio for each frequency on the basis of the amplitude component calculated by the amplitude component calculating part and the noise component estimated by the noise component estimating part; frequency extracting part which extracts frequencies at which the signal-to-noise ratios calculated by the signal-to-noise ratio calculating part are larger than a predetermined value; arrival distance difference calculating part which calculates difference between arrival distances of the sound signal from a target sound source on the basis of the phase difference calculated by the phase difference calculating part of the frequency extracted by the frequency extracting part; and sound arrival direction estimating part which estimates direction in which a target sound source is present on the basis of the difference between the arrival distances calculated by the arrival distance difference calculating part.

Moreover, a second aspect of a method of estimating sound arrival direction according to the present invention is, in the first aspect of the method, characterized in that, at the step of extracting frequencies, a predetermined number of frequencies at which the signal-to-noise ratios are larger than the predetermined value are selected and extracted in the decreasing order of the calculated signal-to-noise ratio.

Still further, a second aspect of a sound arrival direction estimating apparatus according to the present invention is, in the first aspect of the apparatus, characterized in that the frequency extracting part selects and extracts a predetermined number of frequencies at which the signal-to-noise ratios calculated by the signal-to-noise ratio calculating part are larger than the predetermined value in the decreasing order of the calculated signal-to-noise ratio.

Still further, a third aspect of a method of estimating sound arrival direction according to the present invention is a method of estimating direction in which a sound source of sound signal is present, the sound signal being inputted to sound signal input units for inputting sound signals from the sound sources present in multiple directions as inputs of multiple channels, and is characterized by comprising the steps of accepting inputs of multiple channels inputted by the sound signal input units and converting each signal into a sampling signal on a time axis for each channel; transforming each sampling signal on the time axis into a signal on a frequency axis for each channel; calculating a phase component of the transformed signal of each channel on the frequency axis for each identical frequency; calculating phase difference between the multiple channels using the phase component of the signal of each channel, calculated for each identical frequency; calculating an amplitude component of the signal on the frequency axis transformed at a predetermined sampling time; estimating a noise component from the calculated amplitude component; calculating a signal-to-noise ratio for each frequency on the basis of the calculated amplitude component and the estimated noise component; correcting the calculation result of the phase difference at the sampling time on the basis of the calculated signal-to-noise ratio and the calculation results of the phase differences at the past sampling times; calculating difference between arrival distances of the sound signal from a target sound source on the basis of the calculated phase difference after correction; and estimating direction in which a target sound source is present on the basis of the calculated difference between the arrival distances.

Still further, a third aspect of a sound arrival direction estimating apparatus according to the present invention is a sound arrival direction estimating apparatus for estimating direction in which a sound source of sound signal is present, the sound signal being inputted to sound signal inputting parts which input sound signals from the sound sources present in multiple directions as inputs of multiple channels, and is characterized by comprising: sound signal accepting part which accepts sound signals of multiple channels inputted by the sound signal inputting parts and converting each signal into a sampling signal on a time axis for each channel; signal transforming part which transforms each sampling signal on the time axis, converted by the sound signal accepting part, into a signal on a frequency axis for each channel; phase component calculating part which calculates for each identical frequency a phase component of the signal of each channel on the frequency axis transformed by the signal transforming part; phase difference calculating part which calculates phase difference between the multiple channels using the phase component of the signal of each channel, calculated for each identical frequency by the phase component calculating part; amplitude component calculating part which calculates an amplitude component of the signal on the frequency axis transformed at a predetermined sampling time by the signal transforming part; noise component estimating part which estimates a noise component from the amplitude component calculated by the amplitude component calculating part; signal-to-noise ratio calculating part which calculates a signal-to-noise ratio for each frequency on the basis of the amplitude component calculated by the amplitude component calculating part and the noise component estimated by the noise component estimating part; correcting part which corrects the calculation result of the phase difference at the sampling time on the basis of the signal-to-noise ratio calculated by the signal-to-noise ratio calculating part and the calculation results of the phase differences at past sampling times; arrival distance difference calculating part which calculates difference between arrival distances of the sound signal from a target sound source on the basis of the phase difference after corrected by the correcting part; and sound arrival direction estimating part which estimates direction in which a target sound source is present on the basis of the difference between the arrival distances calculated by the arrival distance difference calculating part.

Still further, a fourth aspect of a method of estimating sound arrival direction according to the present invention is, in the first, or third aspect of the method, characterized by further comprising the step of specifying a voice section which is a section indicating voice among the accepted sound signal input, wherein, at the step of transforming the signal into the signal on the frequency axis, only the signal in the voice section specified at the step of specifying voice section is transformed into a signal on the frequency axis.

Still further, a fourth aspect of a sound arrival direction estimating apparatus according to the present invention is, in the first or third aspect of the apparatus, characterized by further comprising voice section specifying part which specifies a voice section which is a section indicating voice among a sound signal input accepted by the sound signal accepting part, wherein the signal transforming part transforms only the signal in the voice section specified by the voice section specifying part into a signal on the frequency axis.

In addition, a computer program product according to the present invention is characterized by realizing the abovementioned method and apparatus by a general purpose computer.

According to the first aspect of the present invention, sound signals from sound sources present in multiple directions are accepted as inputs of multiple channels, and each is converted into a signal on a time axis for each channel. Furthermore, the signal of each channel on the time axis is transformed into a signal on a frequency axis, and a phase component of the converted signal of each channel on the frequency axis is used to calculate phase difference between multiple channels for each frequency. On the basis of the calculated phase difference (hereafter, also referred to as phase difference spectrum), the difference between the arrival distances of the sound input from a target sound source is calculated, and the direction in which the sound source is present is estimated on the basis of the calculated difference between the arrival distances. On the other hand, an amplitude component of the transformed signal on the frequency axis is calculated, and a background noise component is estimated from the calculated amplitude component. On the basis of the calculated amplitude component and the estimated background noise component, a signal-to-noise ratio for each frequency is calculated. Then, frequencies at which the signal-to-noise ratios are larger than a predetermined value are extracted, and the difference between the arrival distances is calculated on the basis of the phase difference at each extracted frequency. As a result, the signal-to-noise ratio (SN ratio) for each frequency is obtained on the basis of the amplitude component of the inputted sound signal, that is, the so-called amplitude spectrum, and the estimated background noise component, that is, the so-called background noise spectrum, and only the phase difference at the frequency at which the signal-to-noise ratio is large is used, whereby the difference between the arrival distances can be obtained more accurately. Therefore, it is possible to accurately estimate an incident angle of the sound signal, that is, direction in which the sound source is present, on the basis of the accurate difference between the arrival distances.

According to the second aspect of the present invention, in the first aspect, a predetermined number of frequencies at which the signal-to-noise ratios are larger than the predetermined value are selected and extracted in the decreasing order of the signal-to-noise ratio. As a result, because the difference between the arrival distances is calculated by sampling frequencies that are less affected by noise components, the calculation result of the difference between the arrival distances does not vary significantly. Hence, it is possible to more accurately estimate the incident angle of the sound signal, that is, the direction in which the target sound source is present.

According to the third aspect of the present invention, sound signals from sound sources present in multiple directions are accepted as inputs of multiple channels, and each converted into a sampling signal on a time axis for each channel, and each sampling signal on the time axis is transformed into a signal on a frequency axis for each channel. The phase component of the transformed signal of each channel on the frequency axis is used to calculate phase difference between multiple channels for each frequency. On the basis of the calculated phase difference, difference between arrival distances of the sound input from a target sound source is calculated, and direction in which the target sound source is present is estimated on the basis of the calculated difference between the arrival distances. The amplitude component of the signal on the frequency axis, transformed at a predetermined sampling time, is calculated, and a background noise component is estimated from the calculated amplitude component. Then, on the basis of the calculated amplitude component and the estimated background noise component, a signal-to-noise ratio for each frequency is calculated. On the basis of the calculated signal-to-noise ratio and the calculation results of the phase differences at past sampling times, the calculation result of the phase difference at the sampling time is corrected, and the difference between the arrival distances is calculated on the basis of the phase difference after correction. As a result, it is possible to obtain a phase difference spectrum in which phase difference information at frequencies at which the signal-to-noise ratios at the past sampling times are large is reflected. Hence, the phase difference does not vary significantly depending on the state of background noise, the change in the content of the sound signal generated from a target sound source, etc. Therefore, it is possible to accurately estimate an incident angle of the sound signal, that is, direction in which the target sound source is present, on the basis of the more accurate and stable difference between the arrival distances.

According to the fourth aspect of the present invention, in the first or second aspect, a voice section which is a section indicating voice among an accepted sound signal is specified, and only the signal in the specified voice section is transformed into a signal on the frequency axis. As a result, it is possible to accurately estimate the direction in which the sound source generating the voice is present.

The above and further objects and features of the invention will more fully be apparent from the following detailed description with accompanying drawings.

DETAILED DESCRIPTION OF THE PRESENT INVENTION

The present invention will be described below in detail on the basis of the drawings showing the embodiments thereof. The embodiments will be described in the case that the sound signal to be processed is mainly voice generated by a human being.

Figure 1:
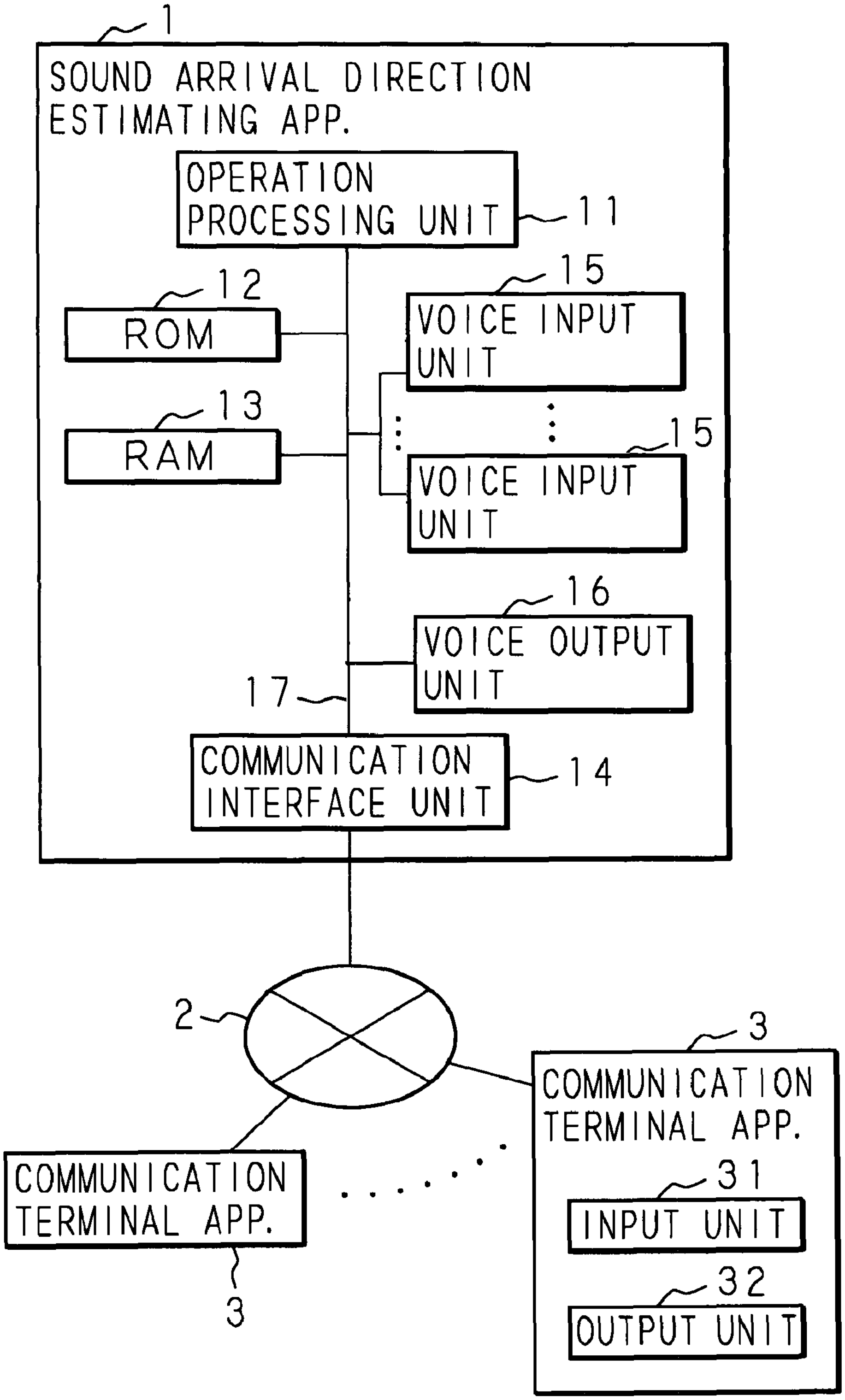
FIG. 1 is a block diagram showing a configuration of a general purpose computer embodying a sound arrival direction estimating apparatus according to Embodiment 1 of the present invention.

FIG. 1 is a block diagram showing a configuration of a general purpose computer embodying a sound arrival direction estimating apparatus 1 according to Embodiment 1 of the present invention.

The general purpose computer, operating as the sound arrival direction estimating apparatus 1 according to Embodiment 1 of the present invention, comprises at least an operation processing unit 11, such as a CPU, a DSP or the like, a ROM 12, a RAM 13, a communication interface unit 14 capable of carrying out data communication to and from an external computer, multiple voice input units 15 that accept voice input, and a voice output unit 16 that outputs voice. The voice output unit 16 outputs voice inputted from the voice input unit 31 of each of communication terminal apparatuses 3 that can carry out data communication via a communication network 2. Voice whose noise is suppressed is outputted from a voice output unit 32 of each of the communication terminal apparatuses 3.

The operation processing unit 11 is connected to the above-mentioned each hardware units of the sound arrival direction estimating apparatus 1 via an internal bus 17. The operation processing unit 11 controls the above-mentioned hardware units, and performs various software functions according to processing programs stored in the ROM 12, such as, for example, a program for calculating the amplitude component of a signal on a frequency axis, a program for estimating a noise component from the calculated amplitude component, a program for calculating a signal-to-noise ratio (SN ratio) at each frequency on the basis of the calculated amplitude component and the estimated noise component, a program for extracting a frequency at which the SN ratio is larger than a predetermined value, a program for calculating the difference between the arrival distances on the basis of the phase difference (hereinafter to be called as a phase difference spectrum) at the extracted frequency, and a program for estimating the direction of the sound source on the basis of the difference between the arrival distances.

The ROM 12 is configured by a flash memory or the like and stores the above-mentioned processing programs and numerical value information referred by the processing programs required to make the general purpose computer to function as the sound arrival direction estimating apparatus 1. The RAM 13 is configured by a SRAM or the like and stores temporary data generated during program execution. The communication interface unit 14 downloads the above-mentioned programs from an external computer, transmits output signals to the communication terminal apparatuses 3 via the communication network 2, and receives inputted sound signals.

Specifically, the voice input units 15 are configured by multiple microphones that respectively accept sound input and used to specify the direction of a sound source, amplifiers, A/D covertures and the like. The voice output unit 16 is an output device, such as a speaker. For convenience of explanation, the voice input units 15 and the voice output unit 16 are built in the sound arrival direction estimating apparatus 1 as shown in FIG. 1. However, in reality, the sound arrival direction estimating apparatus 1 is configured so that the voice input units 15 and the voice output unit 16 are connected to a general purpose computer via an interface.

Figure 2:
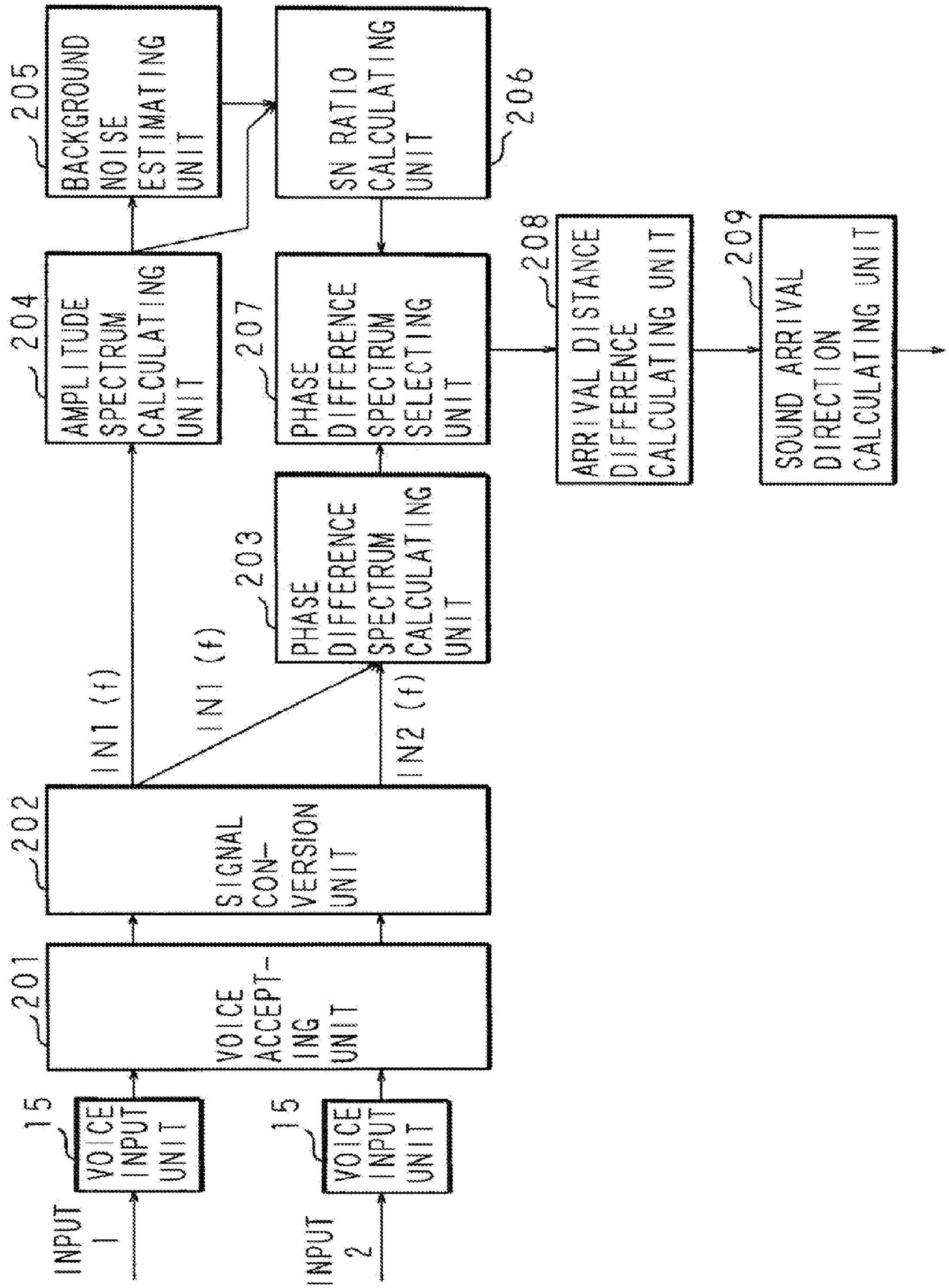
FIG. 2 is a functional block diagram showing functions that are realized when an operation processing unit of the sound arrival direction estimating apparatus according to Embodiment 1 of the present invention performs processing programs.

FIG. 2 is a functional block diagram showing functions that are realized when an operation processing unit 11 of the sound arrival direction estimating apparatus 1 according to Embodiment 1 of the present invention performs the above-mentioned processing programs. In the example shown in FIG. 2, the description is given on the assumption that each of two voice input units 15 and 15 is a microphone, respectively.

As shown in FIG. 2, the sound arrival direction estimating apparatus 1 according to Embodiment 1 of the present invention comprises at least a voice accepting unit (sound signal accepting part) 201, a signal conversion unit (signal converting part) 202, a phase difference spectrum calculating unit (phase difference calculating part) 203, an amplitude spectrum calculating unit (amplitude component calculating part) 204, a background noise estimating unit (noise component estimating part) 205, an SN ratio calculating unit (signal-to-noise ratio calculating part) 206, a phase difference spectrum selecting unit (frequency extracting part) 207, an arrival distance difference calculating unit (arrival distance difference calculating part) 208, and a sound arrival direction calculating unit (sound arrival direction calculating part) 209, as functional blocks that are achieved when the processing programs are executed.

The voice accepting unit 201 accepts from two microphones voice generated by a human being, as sound inputs, which is a sound source. In this embodiment 1, input 1 and input 2 are accepted via the voice input units 15 and 15 each being a microphone.

With respect to inputted voice, the signal conversion unit 202 converts signals on a time axis into signals on a frequency axis, that is, complex spectra IN1($f$) and IN2($f$). Herein, f represents a frequency (radian). In the signal conversion unit 202, a time-frequency conversion process, such as Fourier transform, is carried out. In Embodiment 1, the inputted voice is converted into the spectra IN1($f$) and IN2($f$) by a time-frequency conversion process, such as Fourier transform.

The phase difference spectrum calculating unit 203 calculates phase spectra on the basis of the frequency converted spectra IN1($f$) and IN2($f$), and calculates the phase difference spectrum DIFF_PHASE(f) which is the difference between the calculated phase spectra, for each frequency. Note that the phase difference spectrum DIFF_PHASE(f) may be obtained not by obtaining each phase spectrum of the spectra IN1($f$) and IN2($f$), but by obtaining a phase component of IN1($f$)/IN2($f$). The amplitude spectrum calculating unit 204 calculates one of amplitude spectra, that is, an amplitude spectrum |IN1($f$)| which is the frequency component of the input signal spectrum IN1($f$) of the input 1 in the example shown in FIG. 2, for example. There is no particular limitation as to which amplitude spectrum is calculated. It may be possible that the amplitude spectra |IN1($f$)| and |IN2($f$)| are calculated and the larger one is selected.

Embodiment 1 has a configuration in which the amplitude spectrum |IN1($f$)| is calculated for each frequency in Fourier-transformed spectra. However, Embodiment 1 may also have a configuration in which band division is performed, and the representative value of the amplitude spectrum |IN1($f$)| is obtained in a divided band that is divided depending on specific central frequency and interval. The representative value in that case may be the average value of the amplitude spectrum |IN1($f$)| in the divided band or may be the maximum value thereof. The representative value of the amplitude spectrum after the band division becomes |IN1($n$)|. Where, n represents an index of a divided band.

The background noise estimating unit 205 estimates a background noise spectrum |NOISE1($f$)| on the basis of the amplitude spectrum |IN1($f$)|. The method of estimating the background noise spectrum |NOISE1($f$)| is not limited to any particular method. It may also be possible to use known methods, such as a voice section detecting process being used in speech recognition or a background noise estimating process and the like being carried out in a noise canceling process used in mobile phones. In other words, any method of estimating the background noise spectrum can be used. In the case that the amplitude spectrum is band-divided as described above, the background noise spectrum |NOISE1($n$)| should be estimated for each divided band. Where, n represents an index in of a divided band.

The SN ratio calculating unit 206 calculates the SN ratio SNR(f) by calculating the ratio between the amplitude spectrum |IN1($f$)| calculated in the amplitude spectrum calculating unit 204 and the background noise spectrum |NOISE1($f$)| estimated in the background noise estimating unit 205. The SN ratio SNR(f) is calculated by a following expression (1). In the case that the amplitude spectrum is band-divided, SNR (n) should be calculated for each divided band. Where, n represents an index of a divided band.

$$SNR(f)=20.0\times\log_{10}(|IN1(f)|/|NOISE1(f)|) \qquad (1)$$

The phase difference spectrum selecting unit 207 extracts the frequency or the frequency band at which an SN ratio larger than a predetermined value is calculated in the SN ratio calculating unit 206, and selects the phase difference spectrum corresponding to the extracted frequency or the phase difference spectrum in the extracted frequency band.

The arrival distance difference calculating unit 208 obtains a function in which the relation between the selected phase difference spectrum and frequency f is linear-approximated with a straight line passing through an origin. On the basis of this function, the arrival distance difference calculating unit 208 calculates the difference between the distances to the voice input units 15 and 15 from the sound source, that is, the distance difference D between the distances along which voice arrives at the voice input units 15 and 15.

The sound arrival direction calculating unit 209 calculates an incident angle θ of sound input, that is, the angle θ indicating the direction in which it is estimated that a human being is present which is a sound source, using the distance difference D calculated by the arrival distance difference calculating unit 208 and the installation interval L of the voice input units 15 and 15.

Figure 3:
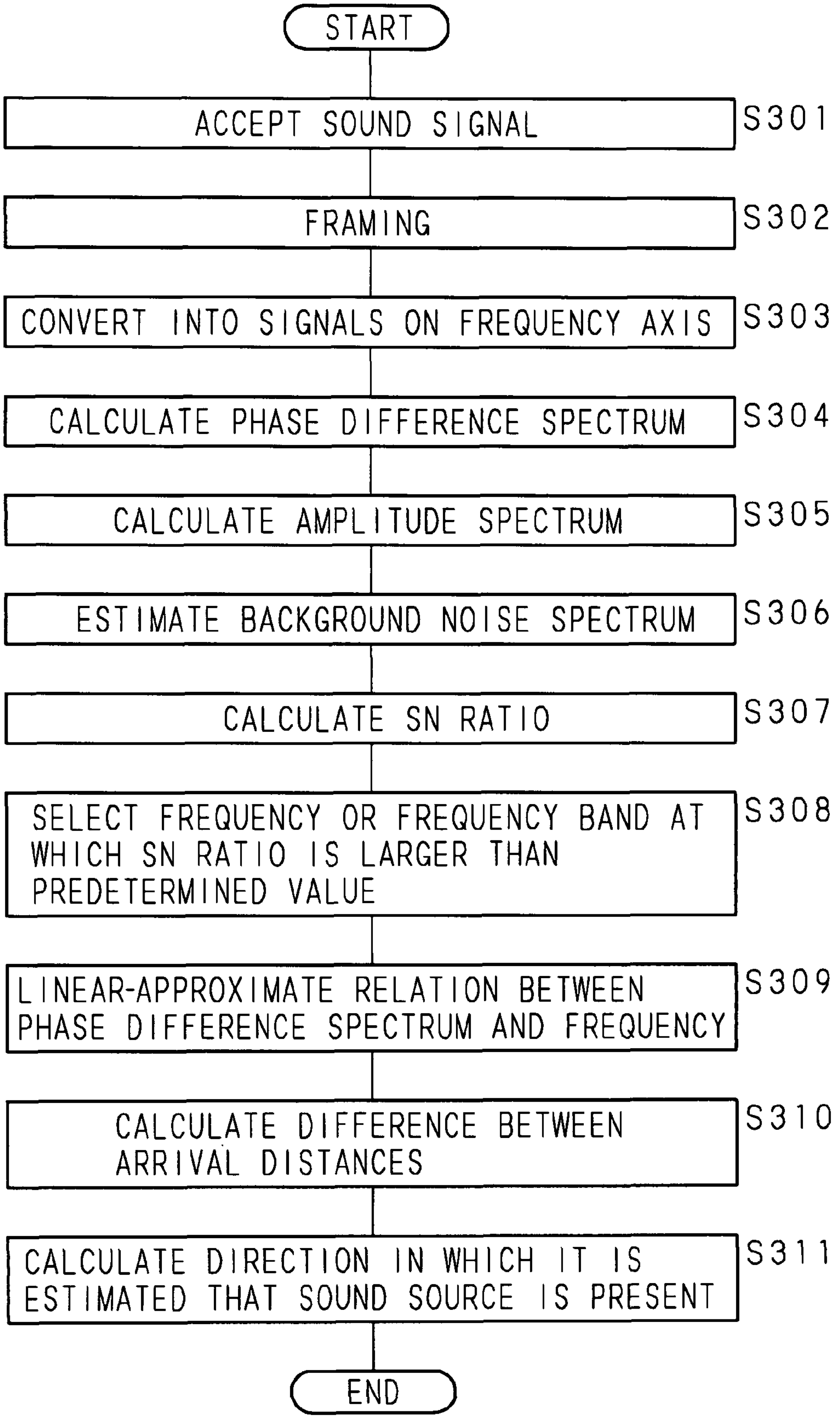
FIG. 3 is a flowchart showing a procedure performed by an operation processing unit of the sound arrival direction estimating apparatus according to Embodiment 1 of the present invention.

The procedure performed by the operation processing unit 11 of the sound arrival direction estimating apparatus 1 according to Embodiment 1 of the present invention will be described below. FIG. 3 is a flowchart showing a procedure performed by the operation processing unit 11 of the sound arrival direction estimating apparatus 1 according to Embodiment 1 of the present invention.

First, the operation processing unit 11 of the sound arrival direction estimating apparatus 1 accepts sound signals (analog signals) from the voice input units 15 and 15 (step S301). After A/D-conversion of the accepted sound signals, the operation processing unit 11 performs framing of the accepted sound signals in a predetermined time unit (step S302). Framing unit is determined depending on the sampling frequency, the kind of an application, etc. At this time, for the purpose of obtaining stable spectra, a time window such as a hamming window, a hanning window or the like is multiplied to the framed sampling signals. For example, framing is carried out in 20 to 40 ms units while being overlapped every 10 to 20 ms, and the following processes are performed for each of the frames.

The operation processing unit 11 converts signals on a time axis in frame units into signals on a frequency axis, that is, spectra IN1($f$) and IN2($f$) (step S303). Where, f represents a frequency (radian). The operation processing unit 11 carries out a time-frequency conversion process, such as Fourier transform. In Embodiment 1, the operation processing unit 11 converts signals on the time axis in frame units into the spectra IN1($f$) and IN2($f$), by carrying out a time-frequency conversion process, such as Fourier transform.

Next, the operation processing unit 11 calculates phase spectra using the real parts and the imaginary parts of the frequency-converted spectra IN1($f$) and IN2($f$), and calculates the phase difference spectrum DIFF_PHASE(f) which is the phase difference between the calculated phase spectra, for each frequency (step S304).

On the other hand, the operation processing unit 11 calculates the value of the amplitude spectrum |IN1($f$)| which is the amplitude component of the input signal spectrum IN1($f$) of input 1 (step S305).

However, the calculation is not required to be limited to the calculation of the amplitude spectrum with respect to the input signal spectrum IN1($f$) of input 1. For example, as another method, it may be possible to calculate the amplitude spectrum with respect to the input signal spectrum |IN2($f$)| of input 2, or it may also be possible to calculate the average value or the maximum value of the amplitude spectra of both inputs 1 and 2 as the representative value of the amplitude spectra. Herein, a configuration is adopted in which the amplitude spectrum |IN1($f$)| is calculated for each frequency in Fourier-transformed spectra. However, it may be possible to adopt a configuration in which band division is performed, and the representative value of the amplitude spectrum |IN1 ($f$)| is calculated in a divided band that is divided depending on specific central frequency and interval. The representative value may be the average value of the amplitude spectrum |IN1($f$)| in the divided band or may be the maximum value thereof. Furthermore, the configuration is not limited to a configuration in which amplitude spectra are calculated, but it may be possible to adopt a configuration in which power spectra are calculated. The SN ratio SNR(f) in this case is calculated according to a following expression (2).

$$SNR(f)=10.0\times\log_{10}(|IN1(f)|^2/|NOISE1(f)|^2) \qquad (2)$$

The operation processing unit 11 estimates a noise section on the basis of the calculated amplitude spectrum |IN1($f$)|, and estimates the background noise spectrum |NOISE1($f$)| on the basis of the amplitude spectrum |IN1($f$)| of the estimated noise section (step S306).

Note that the method of estimating the noise section is not limited to any particular method. For example, as another method, with respect to the method of estimating the background noise spectrum |NOISE1($f$)|, it may also be possible to use known methods, such as a voice section detecting process being used in speech recognition or a background noise estimating process and the like being carried out in a noise canceling process used in mobile phones. In other words, any method of estimating the background noise spectrum can be used. For example, it is possible to estimate a background noise level using power information in whole frequency bands, and to make the voice/noise judgment by obtaining a threshold value for judging voice/noise based on the estimated background noise level. As a result, in the case that judgment result is a noise, it is general that the background noise spectrum |NOISE1($f$)| is estimated by correcting the background noise spectrum |NOISE1(*f*)| using the amplitude spectrum |IN1(*f*)| at that time.

The operation processing unit 11 calculates the SN ratio SNR(f) for each frequency or frequency band according to the expression (1) (or the expression (2) in case of power spectrum) (step S307). The operation processing unit 11 then selects a frequency or a frequency band at which the calculated SN ratio is larger than the predetermined value (step S308). The frequency or frequency band to be selected can be changed according to the method of determining the predetermined value. For example, the frequency or frequency band at which the SN ratio has the maximum value can be selected by comparing the SN ratios between the adjacent frequencies or frequency bands, and by continuously selecting the frequency or frequency band having larger SN ratio while sequentially storing them in the RAM 13 and by selecting it. It may also be possible to select N (N denotes natural number) pieces of frequencies or frequency bands in the decreasing order of the SN ratios.

On the basis of the phase difference spectrum DIFF_PHASE(f) corresponding to one or more selected frequencies or frequency bands, the operation processing unit 11 linear-approximates the relation between the phase difference spectrum DIFF_PHASE(f) and frequency f (step S309). As a result, it is possible to use the fact that the reliability of the phase difference spectrum DIFF_PHASE(f) at the frequency or frequency band at which the SN ratio is large. It is thus possible to raise the estimating accuracy of the proportional relation between the phase difference spectrum DIFF_PHASE(f) and the frequency f.

Figure 4A:
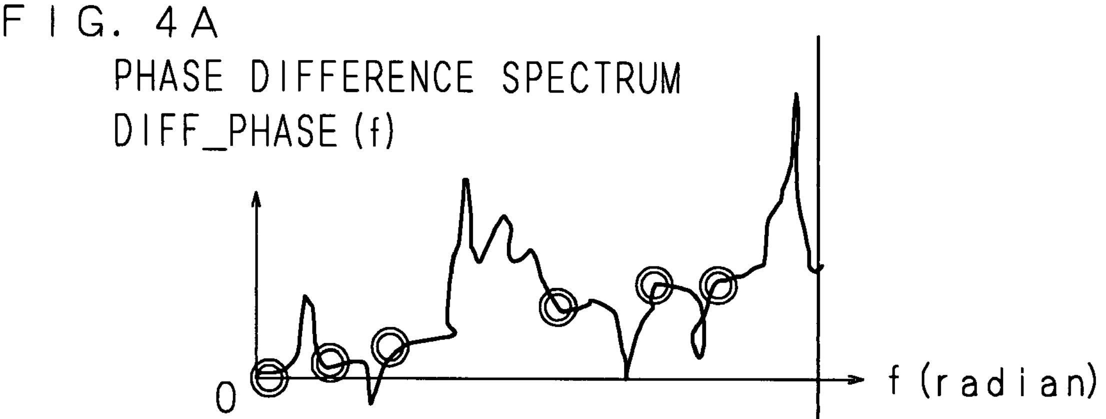
FIG. 4A, FIG. 4B and FIG. 4C are schematic views showing a correcting method of phase difference spectrum in the case that a frequency or a frequency band at which an SN ratio is larger than a predetermined value is selected.
Figure 4B:
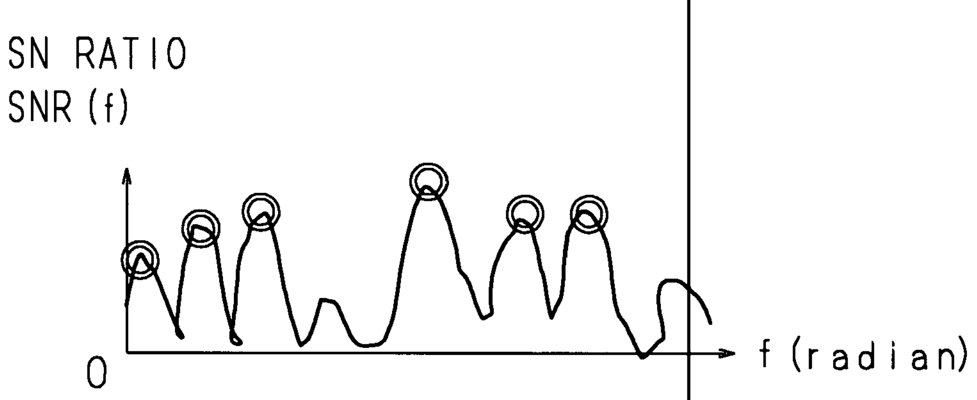
Figure 4C:
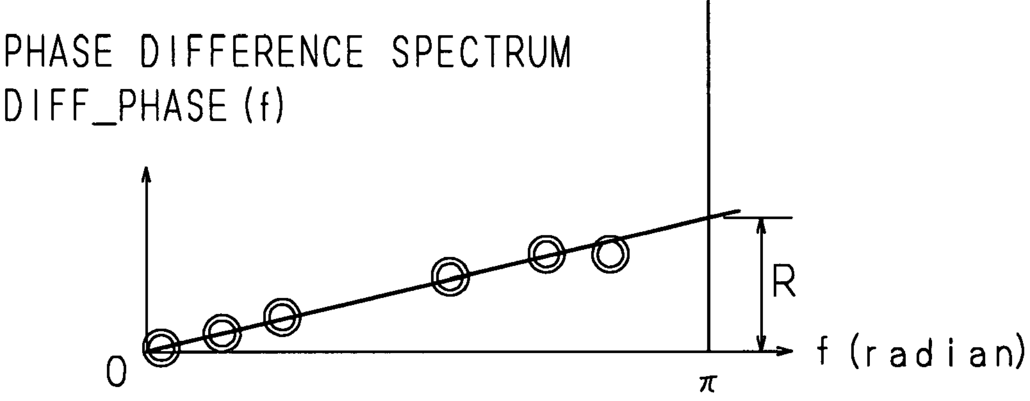

FIG. 4A, FIG. 4B and FIG. 4C are schematic views showing a correcting method of phase difference spectrum in the case that a frequency or a frequency band at which the SN ratio is larger than the predetermined value is selected.

FIG. 4A shows the phase difference spectrum DIFF_PHASE(f) corresponding to a frequency or a frequency band. Because background noise is usually superimposed, it is difficult to find a constant relation.

FIG. 4B shows the SN ratio SNR(f) in a frequency or a frequency band. More specifically, the portion indicated in FIG. 4B by a double circle represents a frequency or a frequency band at which the SN ratio is larger than the predetermined value. Hence, when a frequency or a frequency band at which the SN ratio is larger than the predetermined value, as shown in FIG. 4B, is selected, the phase difference spectrum DIFF_PHASE(f) corresponding to the selected frequency or frequency band becomes the portion indicated by the double circle shown in FIG. 4A. It is found that the proportional relation as shown in FIG. 4C is present between the phase difference spectrum DIFF_PHASE(f) and the frequency f by linear-approximating the phase difference spectrum DIFF_PHASE(f) selected as shown in FIG. 4A.

The operation processing unit 11 then calculates the difference D between the arrival distances of a sound input from the sound source according to a following expression (3) using a value of the linear-approximated phase difference spectrum DIFF_PHASE(π) in Nyquist frequency F, that is, R in FIG. 4C and the speed of sound c (step S310). Nyquist frequency is half of the sampling frequency and becomes π in FIG. 4A, FIG. 4B and FIG. 4C. More specifically, Nyquist frequency becomes 4 kHz in the case that the sampling frequency is 8 kHz.

In addition, in FIG. 4C, an approximate straight line, to which the selected phase difference spectrum DIFF_PHASE(f) is approximated, passing through the origin is show. When, however, respective characteristics of the microphones as the voice input units 15 and 15 are different each other, there is a possibility that bias is applied to the phase difference spectrum extending over whole of range. In such case, the approximate straight line can be obtained by correcting the value R of the phase difference at Nyquist frequency regarding a value corresponding to frequency 0 of the approximate straight line, that is, a value of an intercept of the approximate straight line.

$$D=(R\times c)/(F\times 2\pi) \tag{3}$$

Figure 5:
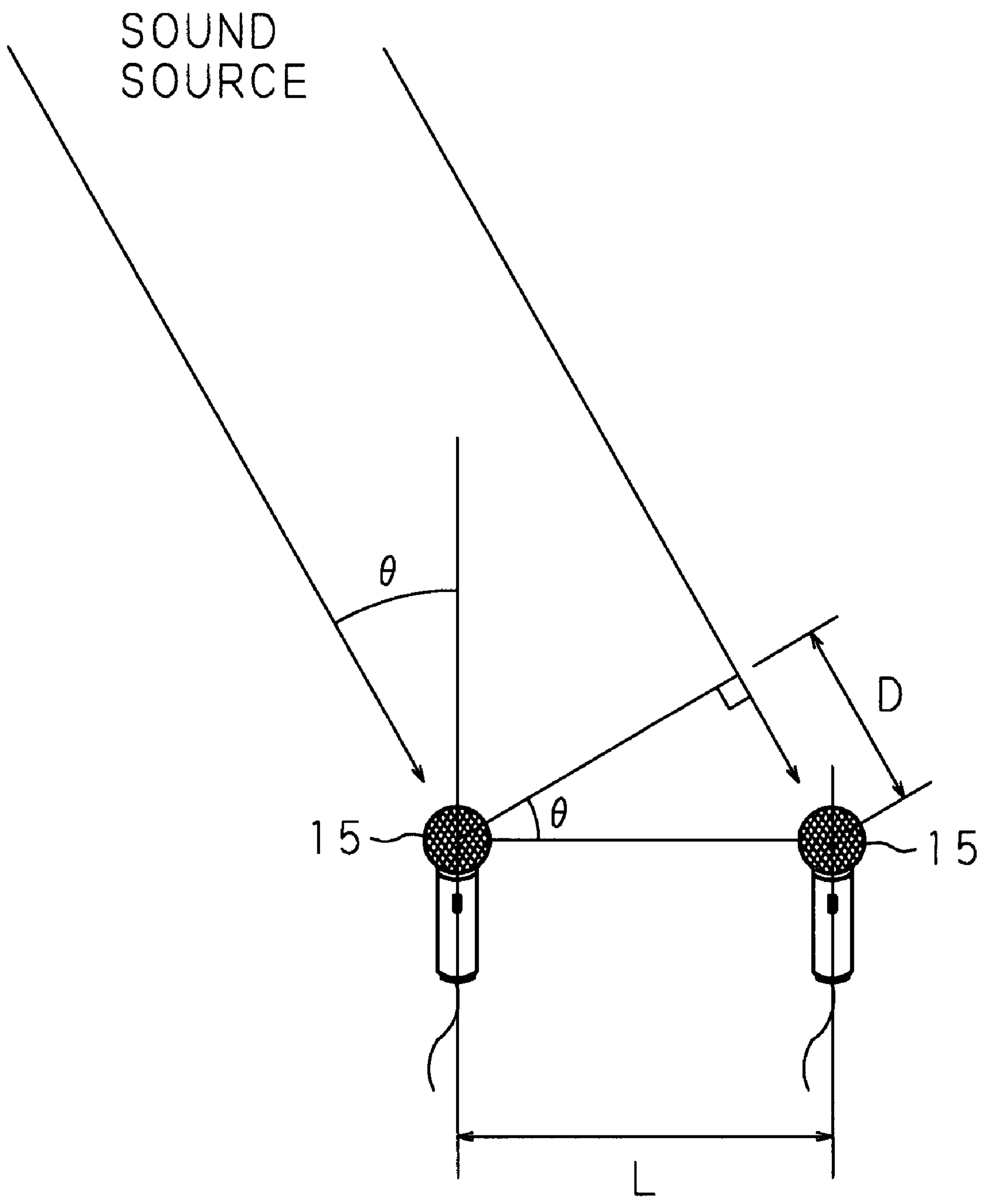
FIG. 5 is a schematic view showing the principle of a method of calculating the angle indicating the direction in which it is estimated that a sound source is present.

The operation processing unit 11 calculates the incident angle θ of sound input, that is, the angle θ indicating the direction in which it is estimated that the sound source is present using the calculated difference D between the arrival distances (step S311). FIG. 5 is a schematic view showing the principle of a method of calculating the angle θ indicating the direction in which it is estimated that the sound source is present.

As shown in FIG. 5, the two voice input units 15 and 15 are installed apart from each other with an interval L. In this case, a relation of "sin θ=(D/L)" is established between the difference D between the arrival distances of the sound input from the sound source and the interval L between the two voice input units 15 and 15. Hence, the angle θ indicating the direction in which it is estimated that the sound source is present can be obtained according to a following expression (4).

$$\theta=\sin^{-1}(D/L) \tag{4}$$

In the case that N pieces of frequencies or frequency bands are selected in the decreasing order of the SN ratios, as described above, linear-approximating is performed by using the top N phase difference spectra. For example, as another method, it may be possible to replace the F and R in the expression (3) with the f and r, respectively, by not using the value R of the linear-approximated phase difference spectrum DIFF_PHASE(F) at the Nyquist frequency F, but the phase difference spectrum r (=DIFF_PHASE(f) at the selected frequency f, and calculate the difference D between the arrival distances for each selected frequency, then calculate the angle θ indicating the direction in which it is estimated that the sound source is present by using an average value of the calculated difference D. The calculation method is not limited to this kind of method as a matter of course. For example, it may also be possible to calculate the angle θ indicating the direction in which it is estimated that the sound source is present by calculating the representative value of the difference D between the arrival distances by weighting depending on the SN ratio.

Furthermore, in the case of estimating the direction in which a human being who generates voice is present, it may also be possible to calculate the angle θ indicating the direction in which it is estimated that the sound source is present by judging whether a sound input is a voice section indicating the voice generated by the human being, and by performing the above-mentioned process only when it is judged as a voice section.

Moreover, even if it is judged that the SN ratio is larger than the predetermined value, in the case that the phase difference is an unintended phase difference in view of the usage states, usage conditions, etc. of an application, it is preferable that the corresponding frequency or frequency band should be eliminated from those to be selected. For example, in the case that the sound arrival direction estimating apparatus 1 according to Embodiment 1 is applied to an apparatus, such as a mobile phone, that is supposed that voice is generated from the front direction, and in the case that it is estimated that the angle θ indicating the direction in which the sound source is present is calculated as θ<−90° or 90°<θ where it is assumed that the front is 0°, it is judged as an unintended state.

Still further, even if it is judged that the SN ratio is larger than the predetermined value, it is preferable that frequencies or frequency bands that are not desirable to estimate the direction of the target sound source should be eliminated from those to be selected, in view of the usage states, usage conditions, etc. of an application. For example, in the case that the target sound source is voice generated by a human being, there is no sound signal having frequencies of 100 Hz or less. Hence, frequencies of 100 Hz or less can be eliminated from the frequencies to be selected.

As described above, in the sound arrival direction estimating apparatus 1 according to Embodiment 1, the SN ratio for each frequency or frequency band is obtained on the basis of the amplitude component of the inputted sound signal, that is, the so-called amplitude spectrum, and the estimated background noise spectrum, and the phase difference (phase difference spectrum) at the frequency at which the SN ratio is large is used, whereby the difference D between the arrival distances can be obtained more accurately. Therefore, it is possible to accurately calculate the incident angle of the sound signal, that is, the angle θ indicating the direction in which it is estimated that the target sound source (a human being in Embodiment 1) is present, on the basis of the accurate difference D between the arrival distances.

Embodiment 2

A sound arrival direction estimating apparatus 1 according to Embodiment 2 of the present invention will be described below in detail referring to the drawings. Because the configuration of the general purpose computer operating as the sound arrival direction estimating apparatus 1 according to Embodiment 2 of the present invention is similar to that according to Embodiment 1, the configuration can be understood referring to the block diagram of FIG. 1, and is not described herein in detail. Embodiment 2 differs from Embodiment 1 in that the calculation results of the phase difference spectra in frame units are stored, and the phase difference spectrum in a frame to be calculated is corrected at any time on the basis of the phase difference spectrum stored at the last time and the SN ratio in the same frame to be calculated.

Figure 6:
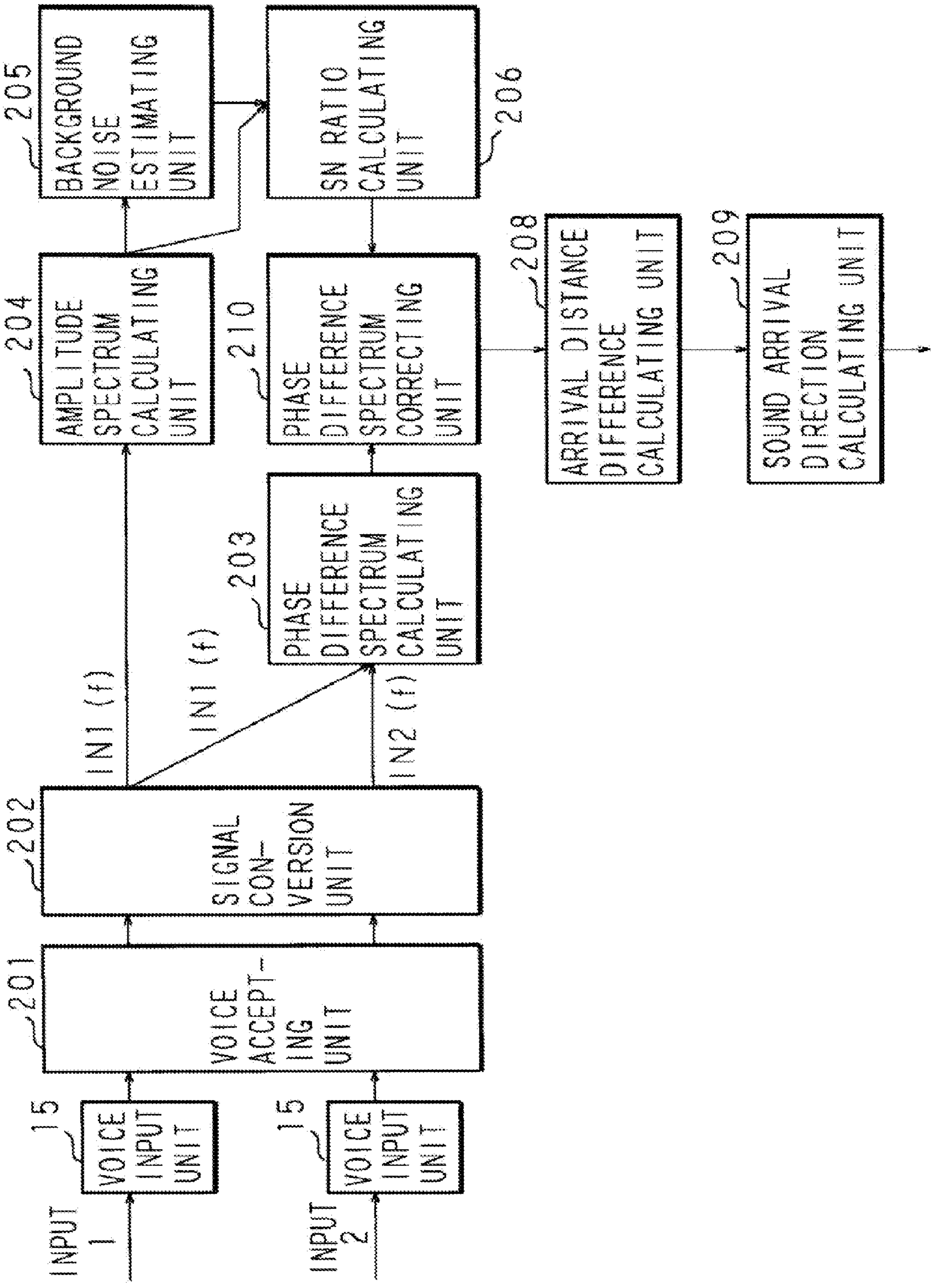
FIG. 6 is a functional block diagram showing functions that are realized when an operation processing unit of the sound arrival direction estimating apparatus according to Embodiment 2 of the present invention performs processing programs.

FIG. 6 is a functional block diagram showing functions that are realized when an operation processing unit 11 of the sound arrival direction estimating apparatus 1 according to Embodiment 2 of the present invention performs processing programs. In the example shown in FIG. 6, the description is given on the assumption that each of the voice input units 15 and 15 is configured by one microphone, respectively, as in the case of Embodiment 1.

As shown in FIG. 6, the sound arrival direction estimating apparatus 1 according to Embodiment 2 of the present invention comprises at least a voice accepting unit (sound signal accepting part) 201, a signal conversion unit (signal converting part) 202, a phase difference spectrum calculating unit (phase difference calculating part) 203, an amplitude spectrum calculating unit (amplitude component calculating part) 204, a background noise estimating unit (noise component estimating part) 205, an SN ratio calculating unit (signal-to-noise ratio calculating part) 206, a phase difference spectrum correcting unit (correcting part) 210, an arrival distance difference calculating unit (arrival distance difference calculating part) 208, and a sound arrival direction calculating unit (sound arrival direction calculating part) 209, as functional blocks that are achieved when the processing programs are executed.

The voice accepting unit 201 accepts from two microphones voice generated by a human being which is a sound source. In this embodiment 2, input 1 and input 2 are accepted via the voice input units 15 and 15 each being a microphone.

With respect to input voice, the signal conversion unit 202 converts signals on a time axis into signals on a frequency axis, that is, complex spectra IN1(*f*) and IN2(*f*). Herein, f represents a frequency (radian). In the signal conversion unit 202, a time-frequency conversion process, such as Fourier transform, is carried out. In Embodiment 2, the inputted voice is converted into the spectra IN1(*f*) and IN2(*f*) by a time-frequency conversion process, such as Fourier transform.

After A/D-conversion of the input signal accepted by the voice input units 15 and 15, obtained sample signals are framed in a predetermined time unit. At this time, for the purpose of obtaining stable spectra, a time window such as a hamming window, a hanning window or the like is multiplied to the framed sampling signals. Framing unit is determined depending on the sampling frequency, the kind of an application, etc. For example, framing is carried out in 20 to 40 ms units while being overlapped every 10 to 20 ms, and the following processes are performed for each of the frames.

The phase difference spectrum calculating unit 203 calculates phase spectra in frame units on the basis of the frequency converted spectra IN1(*f*) and IN2(*f*), calculates the phase difference spectrum DIFF_PHASE(f) which is the phase difference between the calculated phase spectra in frame units. Here, the amplitude spectrum calculating unit 204 calculates one of amplitude spectra, that is, an amplitude spectrum |IN1(*f*)| which is the frequency component of the input signal spectrum IN1(*f*) of the input 1 in the example shown in FIG. 6, for example. There is no particular limitation as to which amplitude spectrum is calculated. It may be possible that the amplitude spectra |IN1(*f*)| and |IN2(*f*)| are calculated, and the average value of the two is selected or the larger one is selected.

The background noise estimating unit 205 estimates a background noise spectrum |NOISE1(*f*)| on the basis of the amplitude spectrum |IN1(*f*)|. The method of estimating the background noise spectrum |NOISE1(*f*)| is not limited to any particular method. It may also be possible to use known methods, such as a voice section detecting process being used in speech recognition or a background noise estimating process and the like being carried out in a noise canceling process used in mobile phones. In other words, any method of estimating the background noise spectrum can be used.

The SN ratio calculating unit 206 calculates the SN ratio SNR(f) by calculating the ratio between the amplitude spectrum |IN1(*f*)| calculated in the amplitude spectrum calculating unit 204 and the background noise spectrum |NOISE1(*f*)| estimated in the background noise estimating unit 205.

On the basis of the SN ratio calculated in the SN ratio calculating unit 206 and the phase difference spectrum $DIFF\_PHASE_{t-1}$(f) calculated at the last sampling time and stored in the RAM 13 after being corrected by the phase difference spectrum correcting unit 210, the phase difference spectrum correcting unit 210 corrects the phase difference spectrum $DIFF\_PHASE_t$(f) calculated at the present sampling time, that is, the next sampling time. At the current sampling time, the SN ratio and the phase difference spectrum $DIFF\_PHASE_t$(f) is calculated in a similar way as that done up to the last time, and the phase difference spectrum $DIFF\_PHASE_t$(f) of the frame at the current sampling time is calculated according to a following expression (5) using a correction coefficient α (0≦α≦1) that is set according to the SN ratio.

The correction coefficient α will be described later. For example, together with each program, the correction coefficient α is stored in the ROM 12 as the numerical value information which corresponds to the SN ratio and is referred by the processing program.

$$DIFF\_PHASE_t(f)=\alpha\times DIFF\_PHASE_t(f)+(1-\alpha)\times DIFF\_PHASE_{t-1}(f) \quad (5)$$

The arrival distance difference calculating unit 208 obtains a function in which the relation between the selected phase difference spectrum and frequency f is linear-approximated with a straight line passing through an origin. On the basis of this function, the arrival distance difference calculating unit 208 calculates the difference between the distances to the voice input units 15 and 15 from the sound source, that is, the distance difference D between the distances along which voice arrives at the voice input units 15 and 15.

The sound arrival direction calculating unit 209 calculates an incident angle θ of sound input, that is, the angle θ indicating the direction in which it is estimated that a human being is present which is a sound source, using the distance difference D calculated by the arrival distance difference calculating unit 208 and the installation interval L of the voice input units 15 and 15.

Figure 7:
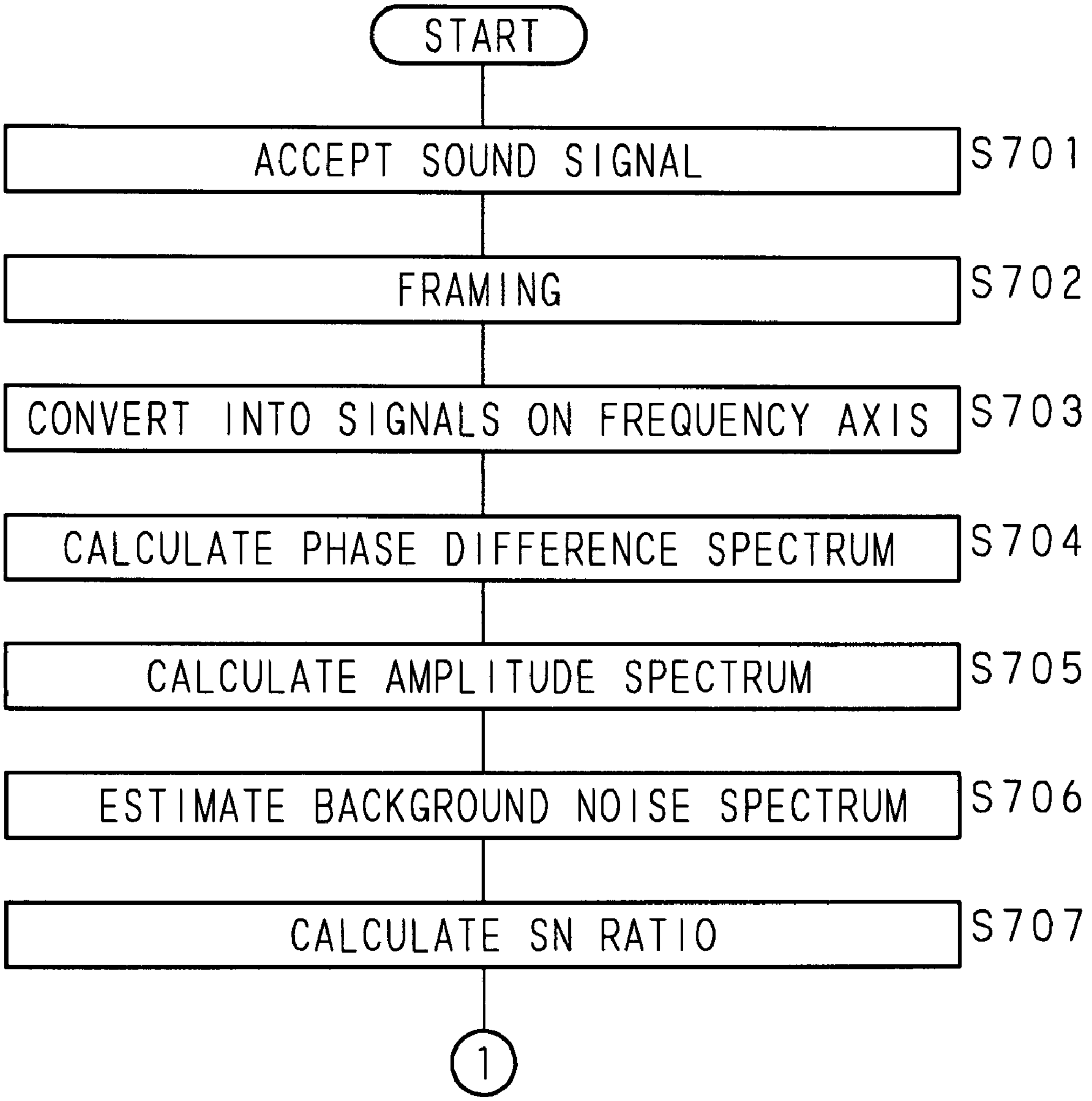
FIG. 7 is a flowchart showing a procedure performed by an operation processing unit of the sound arrival direction estimating apparatus according to Embodiment 2 of the present invention.
Figure 8A:
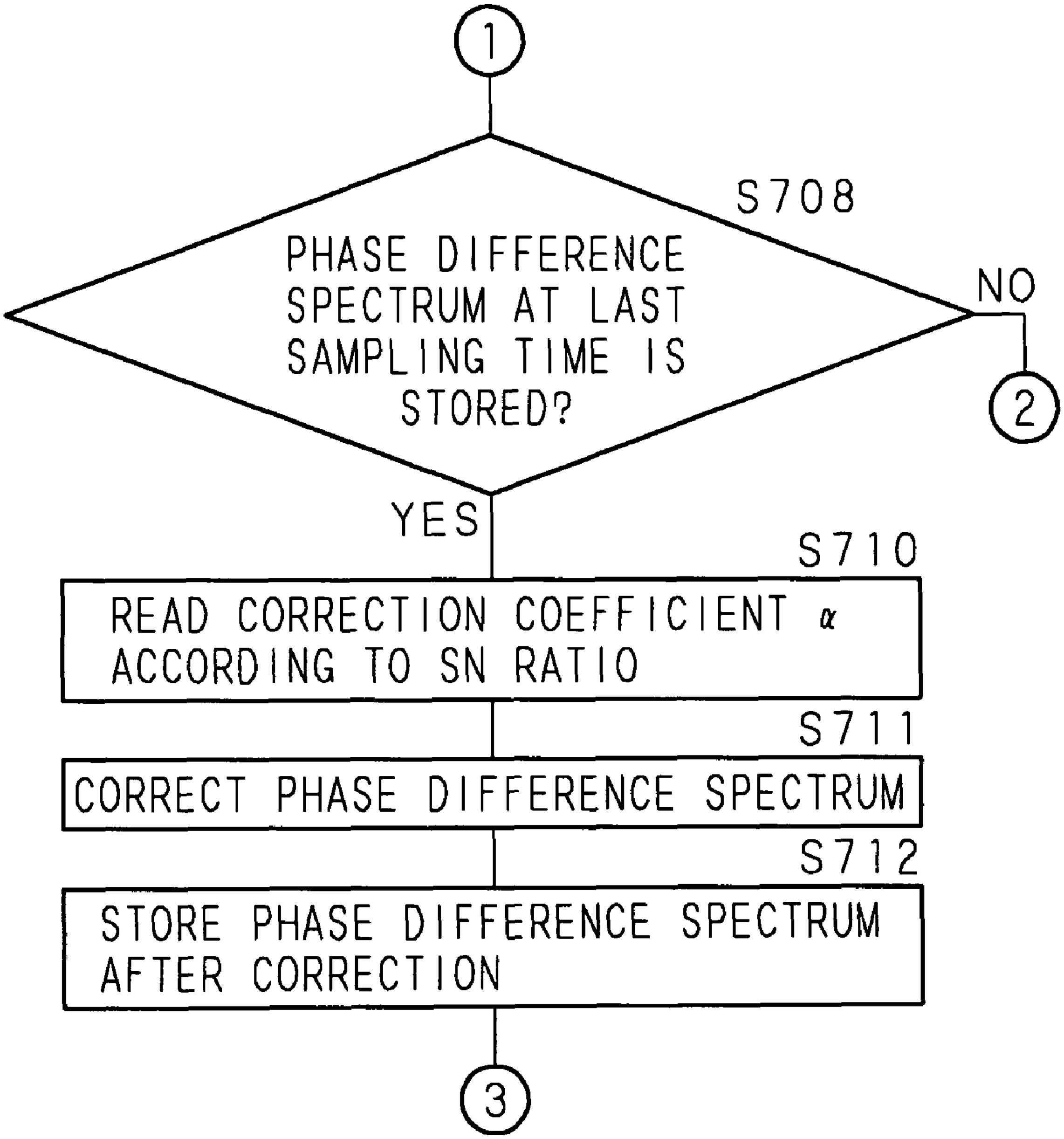
FIG. 8A and FIG. 8B are flowcharts showing a procedure performed by an operation processing unit of the sound arrival direction estimating apparatus according to Embodiment 2 of the present invention.
Figure 8B:
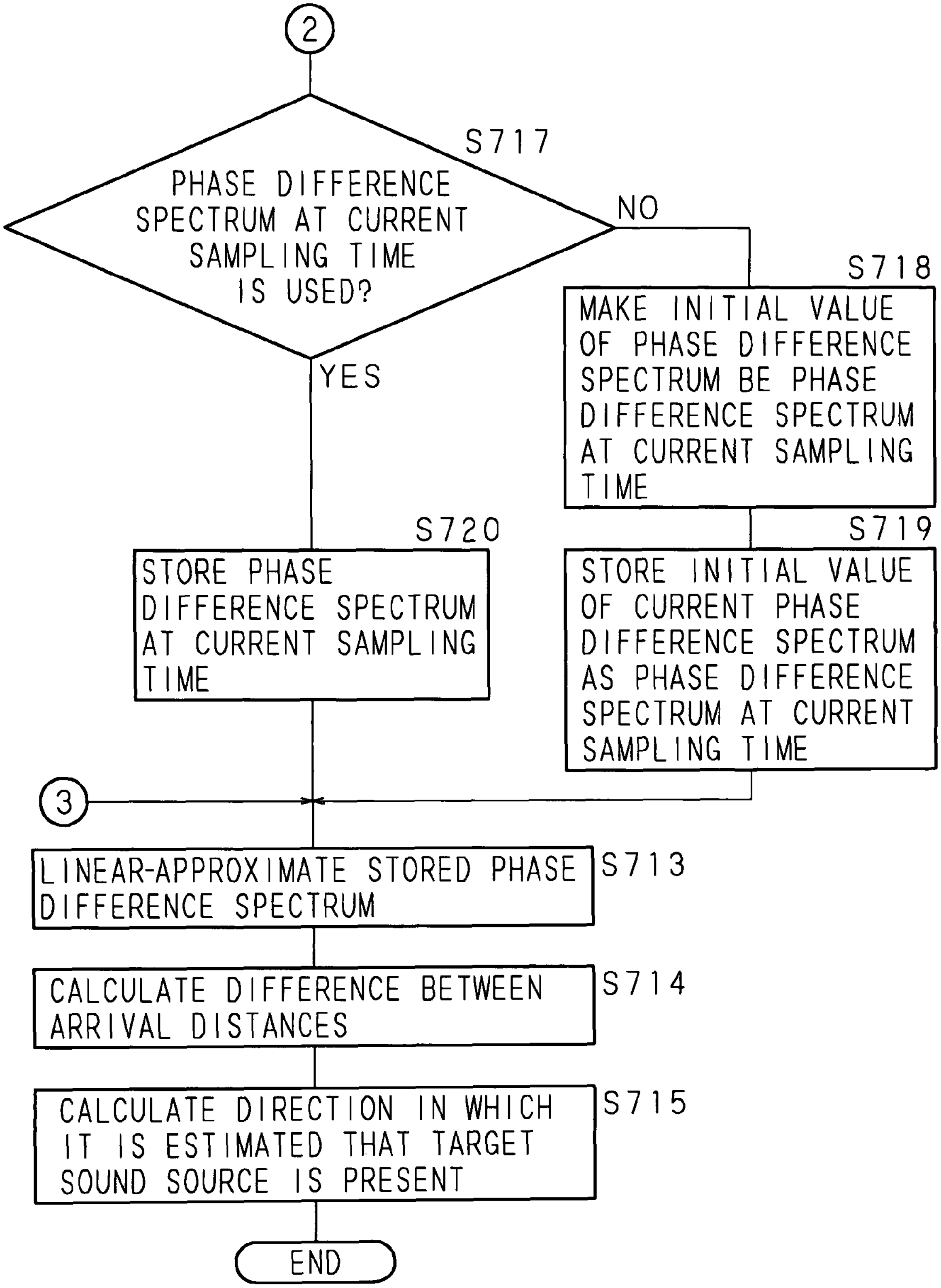

The procedure performed by the operation processing unit 11 of the sound arrival direction estimating apparatus 1 according to Embodiment 2 of the present invention will be described below. FIG. 7 and FIG. 8 are flowcharts showing a procedure performed by the operation processing unit 11 of the sound arrival direction estimating apparatus 1 according to Embodiment 1 of the present invention.

First, the operation processing unit 11 of the sound arrival direction estimating apparatus 1 accepts sound signals (analog signals) from the voice input units 15 and 15 (step S701). After A/D-conversion of the accepted sound signals, the operation processing unit 11 performs framing of the accepted sound signals in a predetermined time unit (step S702). Framing unit is determined depending on the sampling frequency, the kind of an application, etc. At this time, for the purpose of obtaining stable spectra, a time window such as a hamming window, a hanning window or the like is multiplied to the framed sampling signals. For example, framing is carried out in 20 to 40 ms units while being overlapped every 10 to 20 ms, and the following processes are performed for each of the frames.

The operation processing unit 11 converts signals on a time axis in frame units into signals on a frequency axis, that is, spectra IN1(*f*) and IN2(*f*) (step S703). Where, f represents a frequency (radian) or a frequency band having a constant width at sampling. The operation processing unit 11 carries out a time-frequency conversion process, such as Fourier transform. In Embodiment 2, the operation processing unit 11 converts signals on the time axis in frame units into the spectra IN1(*f*) and IN2(*f*), by carrying out a time-frequency conversion process, such as Fourier transform.

Next, the operation processing unit 11 calculates phase spectra using the real parts and the imaginary parts of the frequency-converted spectra IN1(*f*) and IN2(*f*), and calculates the phase difference spectrum $DIFF\_PHASE_t(f)$ which is the phase difference between the calculated phase spectra, for each frequency or frequency band (step S704).

On the other hand, the operation processing unit 11 calculates the value of the amplitude spectrum |IN1(*f*)| which is the amplitude component of the input signal spectrum IN1(*f*) of input 1 (step S705).

However, the calculation is not required to be limited to the calculation of the amplitude spectrum with respect to the input signal spectrum IN1(*f*) of input 1. For example, as another method, it may be possible to calculate the amplitude spectrum with respect to the input signal spectrum |IN2(*f*)| of input 2, or it may also be possible to calculate the average value or the maximum value of the amplitude spectra of both inputs 1 and 2 as the representative value of the amplitude spectra. Furthermore, the configuration is not limited to a configuration in which amplitude spectra are calculated, but it may be possible to adopt a configuration in which power spectra are calculated.

The operation processing unit 11 estimates a noise section on the basis of the calculated amplitude spectrum |IN1(*f*)|, and estimates the background noise spectrum |NOISE1(*f*)| on the basis of the amplitude spectrum |IN1(*f*)| of the estimated noise section (step S706).

The method of estimating the noise section is not limited to any particular method. For example, as another method, with respect to the method of estimating the background noise spectrum |NOISE1(*f*)|, it is possible to estimate a background noise level using power information in whole frequency bands, and to make the voice/noise judgment by obtaining a threshold value for judging voice/noise based on the estimated background noise level. As a result, in the case that judgment result is a noise, any methods for estimating the background noise spectrum can be used, in which the background noise spectrum |NOISE1(*f*)| is estimated by correcting the background noise spectrum |NOISE1(*f*)| using the amplitude spectrum |IN1(*f*)| at that time.

The operation processing unit 11 calculates the SN ratio SNR(f) for each frequency or frequency band according to the above-mentioned expression (1) (step S707). Next, the operation processing unit 11 judges whether the phase difference spectrum $DIFF\_PHASE_{t-1}(f)$ at the last sampling time is stored in the RAM 13 or not (step S708).

In the case that the operation processing unit 11 judges that the phase difference spectrum $DIFF\_PHASE_{t-1}(f)$ at the last sampling time is stored (YES at step S708), the operation processing unit 11 reads from the ROM 12 the correction coefficient α corresponding to the SN ratio at the calculated sampling time (current sampling time) (step S710). In addition, the correction coefficient α may be obtained by calculating using a function which represents relation between the SN ratio and the correction coefficient α and is built in the program in advance.

Figure 9:
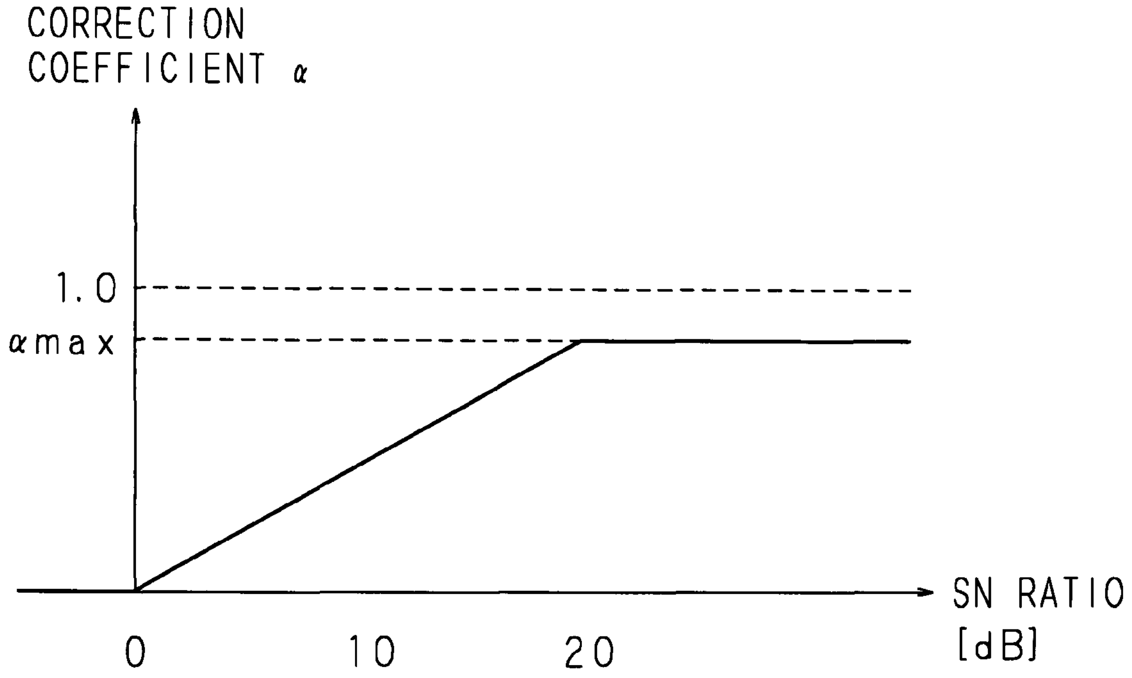
FIG. 9 is a graph showing an example of a correction coefficient depending on an SN ratio.

FIG. 9 is a graph showing an example of the correction coefficient α depending on the SN ratio. In the example shown in FIG. 9, the correction coefficient α is set to 0 (zero) when the SN ratio is 0 (zero). When the calculated SN ratio is 0 (zero), as understanding from the abovementioned expression (5), this means that the subsequent processes are carried out by using the phase difference spectrum $DIFF\_PHASE_{t-1}(f)$ at the past time as the phase difference spectrum at the current time without using the calculated phase difference spectrum $DIFF\_PHASE_t(f)$. As the SN ratio becomes larger, the correction coefficient α is set so as to increase monotonously. In a region in which the SN ratio is 20 dB or more, the correction coefficient α is fixed to a maximum value α max smaller than 1. The reason that the maximum value α max of the correction coefficient α is set smaller than 1 here is to prevent the value of the phase difference spectrum DIFF-_PHASE$_t$(f) from replacing with the phase difference spectrum of its noise by 100% when a noise having high SN ratio occurs unexpectedly.

The operation processing unit 11 corrects the phase difference spectrum DIFF_PHASE$_t$(f) according to the above-mentioned expression (5) using the correction coefficient α having been read from the ROM 12 corresponding to the SN ratio (step S711). After that, the operation processing unit 11 updates the corrected phase difference spectrum DIFF_PHASE$_{t-1}$(f) stored in RAM 13, to the corrected phase difference spectrum DIFF_PHASE$_t$(f) at the current sampling time, and stores it (step S712).

In the case that the operation processing unit 11 judges that the phase difference spectrum DIFF_PHASE$_{t-1}$(f) at the last sampling time is not stored (NO at step S708), the operation processing unit 11 judges whether the phase difference spectrum DIFF_PHASE$_t$(f) at the current sampling time is used or not (step S717). As the criterion for the judgment as to whether the phase difference spectrum DIFF_PHASE$_t$(f) at the current sampling time is used or not, the criterion whether or not the sound signal is generated from the target sound source (whether or not a human being generates voice) such as the SN ratio in whole frequency bands, the judgment result of voice/noise, and the like is used.

In the case that the operation processing unit 11 judges that the phase difference spectrum DIFF_PHASE$_t$(f) at the current sampling time is not used, that is, judges that there is a low possibility that a sound signal is generated from the sound source (NO at step S717), the operation processing unit 11 makes a predetermined initial value of the phase difference spectrum, to be the phase difference spectrum at the current sampling time (step S718). In this case, for example, the initial value of the phase difference spectrum is set to 0 (zero) for all frequencies. However, the setting at step S718 is not limited to this value (i.e. zero).

Next, the operation processing unit 11 stores the initial value of the phase difference spectrum as the phase difference spectrum at the current sampling time in the RAM 13 (step S719), and advances the processing to step S713.

In the case that the operation processing unit 11 judges that the phase difference spectrum DIFF_PHASE$_t$(f) at the current sampling time is used, that is, judges that there is a high possibility that a sound signal is generated from the sound source (YES at step S717), the operation processing unit 11 stores the phase difference spectrum DIFF_PHASE$_t$(f) at the current sampling time in the RAM 13 (step S720), and advances the processing to step S713.

On the basis of the selected phase difference spectrum DIFF_PHASE(f) stored at any one of step S712, S719 and S720, the operation processing unit 11 linear-approximates the relation between the phase difference spectrum DIFF_PHASE(f) and frequency f with a straight line passing through an origin (step S713). As a result, when linear-approximation based on the corrected phase difference spectrum is performed, it is possible to use the phase difference spectrum DIFF_PHASE(f) which reflects information of the phase difference at the frequency or frequency band at which the SN ratio is large (that is, high reliability) not at the current sampling time but at the past sampling time. It is thus possible to raise the estimating accuracy of a proportional relation between the phase difference spectrum DIFF_PHASE(f) and the frequency f.

The operation processing unit 11 calculates the difference D between the arrival distances of the sound signal from the sound source using the value R of the phase difference spectrum DIFF_PHASE(F) which is linear-approximated at the Nyquist frequency F according to the above-mentioned expression (3) (step S714). Note that the difference D between the arrival distances can be calculated by replacing the F and R in the expression (3) with the f and r, respectively, even if the value r (=DIFF_PHASE(f) of the phase difference spectrum at arbitrarily frequency f is used without using the value R of the linear-approximated phase difference spectrum DIFF_PHASE(F) at the Nyquist frequency F. Then, the operation processing unit 11 calculates the incident angle θ of the sound signal, that is, the angle θ indicating the direction in which it is estimated that the sound source (human being) is present, using the calculated difference D between the arrival distances (step S715).

Furthermore, in the case of estimating the direction in which a human being who generates voice is present, it may also be possible to calculate the angle θ indicating the direction in which it is estimated that the sound source is present by judging whether a sound input is a voice section indicating the voice generated by the human being, and by performing the above-mentioned process only when it is judged as a voice section.

Moreover, even if it is judged that the SN ratio is larger than the predetermined value, in the case that the phase difference is an unintended phase difference in view of the usage states, usage conditions, etc. of an application, it is preferable that the corresponding frequency or frequency band should be eliminated from those corresponding to the phase difference spectrum at the current sampling time that is to be corrected. For example, in the case that the sound arrival direction estimating apparatus 1 according to Embodiment 2 is applied to an apparatus, such as a mobile phone, that is supposed that voice is generated from the front direction, and in the case that it is estimated that the angle θ indicating the direction in which the sound source is present is calculated as $\theta < -90°$ or $90° < \theta$ where it is assumed that the front is 0°, it is judged as an unintended state. In this case, the phase difference spectrum at the current sampling time is not used, but the phase difference spectrum calculated at the last time or before is used.

Still further, even if it is judged that the SN ratio is larger than the predetermined value, it is preferable that frequencies or frequency bands that are not desirable to estimate the direction of the target sound source should be eliminated from those to be selected, in view of the usage states, usage conditions, etc. of an application. For example, in the case that the target sound source is voice generated by a human being, there is no sound signal having frequencies of 100 Hz or less. Hence, frequencies of 100 Hz or less can be eliminated from the frequencies to be selected.

As described above, in the sound arrival direction estimating apparatus 1 according to Embodiment 2, in the case that the phase difference spectrum in a frequency or a frequency band at which the SN ratio is large is calculated, correction is carried out while the phase difference spectrum at the sampling time (current sampling time) is weighted more than the phase difference spectrum calculated at the last sampling time, and in the case that the SN ratio is small, correction is carried out while the phase difference spectrum at the last sampling time is weighted. Hence, newly calculated phase difference spectra can be corrected sequentially. Phase difference information at frequencies at which the SN ratios at the past sampling times are large is also reflected in the corrected phase difference spectrum. Accordingly, the phase difference spectrum does not vary significantly under the influence of the state of background noise, the change in the content of the sound signal generated from a target sound source, etc. Therefore, it is possible to accurately calculate the incident angle of the sound signal, that is, the angle θ indicating the direction in which it is estimated that the target sound source is present, on the basis of the more accurate and stable difference D between the arrival distances. The method of calculating the angle θ indicating the direction in which it is estimated that the target sound source is present is not limited to the method in which the above-mentioned difference D between the arrival distances is used, but it is needless to say that various methods can be used, provided that the methods can carry out estimation with similar accuracy.

As described above in detail, according to a first aspect of the present invention, the signal-to-noise ratio (SN ratio) for each frequency is obtained on the basis of the amplitude component of the inputted sound signal, that is, the so-called amplitude spectrum, and the estimated background noise spectrum, and only the phase difference (phase difference spectrum) at the frequency at which the signal-to-noise ratio is large is used, whereby the difference between the arrival distances can be obtained more accurately. Therefore, it is possible to accurately estimate the incident angle of the sound signal, that is, the direction in which it is estimated that the sound source is present, on the basis of the accurate difference between the arrival distances.

In addition, according to a second aspect of the present invention, because the difference between the arrival distances is calculated by preferentially selecting frequencies that are less affected by noise components, the calculation result of the difference between the arrival distances does not vary significantly. Hence, it is possible to more accurately estimate the incident angle of the sound signal, that is, the direction in which the target sound source is present.

Furthermore, according to a third aspect of the present invention, in the case that the phase difference (phase difference spectrum) is calculated to obtain the difference between the arrival distances, newly calculated phase differences can be corrected sequentially on the basis of the phase differences calculated at the past sampling times. Because phase difference information at frequencies at which the SN ratios at the past sampling times are large is reflected in the corrected phase difference spectrum, the phase difference does not vary significantly depending on the state of background noise, the change in the content of the sound signal generated from a target sound source, etc. Therefore, it is possible to accurately estimate the incident angle of the sound signal, that is, the direction in which the target sound source is present, on the basis of the more accurate and stable difference between the arrival distances.

Moreover, according to a fourth aspect of the present invention, it is possible to accurately estimate the direction in which a sound source, such as a human being, generating voice is present.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of estimating direction in which a sound source of sound signal is present, the sound signal being inputted to sound signal input units for inputting sound signals from the sound sources present in multiple directions as inputs of multiple channels, comprising the steps of:

accepting inputs of multiple channels inputted by the sound signal input units and converting each signal into a signal on a time axis for each channel;

transforming the signal of each channel on the time axis into a signal on a frequency axis;

calculating a phase component of the transformed signal of each channel on the frequency axis for each identical frequency;

calculating phase difference between the multiple channels using the phase component of the signal of each channel, calculated for each identical frequency;

calculating an amplitude component of the transformed signal on the frequency axis;

estimating an amplitude noise component from the calculated amplitude component;

calculating a signal-to-noise ratio for each frequency on the basis of a ratio between the calculated amplitude component and the estimated amplitude noise component;

extracting frequencies at which the signal-to-noise ratios are larger than a predetermined value;

calculating difference between arrival distances of the sound signal from a target sound source on the basis of the calculated phase difference of the extracted frequencies; and estimating direction in which a target sound source is present on the basis of the calculated difference between the arrival distances.

2. The method of estimating sound arrival direction as set forth in claim 1, wherein, at the step of extracting frequencies, a predetermined number of frequencies at which the signal-to-noise ratios are larger than the predetermined value are selected and extracted in the decreasing order of the calculated signal-to-noise ratio.

3. The method of estimating sound arrival direction as set forth in claim 2, further comprising the step of specifying a voice section which is a section indicating voice among the accepted sound signal input, wherein, at the step of transforming the signal into the signal on the frequency axis, only the signal in the voice section specified at the step of specifying voice section is transformed into a signal on the frequency axis.

4. A method of estimating direction in which a sound source of sound signal is present, the sound signal being inputted to sound signal input units for inputting sound signals from the sound sources present in multiple directions as inputs of multiple channels, comprising the steps of:

accepting inputs of multiple channels inputted by the sound signal input units and converting each signal into a sampling signal on a time axis for each channel;

transforming each sampling signal on the time axis into a signal on a frequency axis for each channel;

calculating a phase component of the transformed signal of each channel on the frequency axis for each identical frequency;

calculating phase difference between the multiple channels using the phase component of the signal of each channel, calculated for each identical frequency;

calculating an amplitude component of the signal on the frequency axis transformed at a predetermined sampling time;

estimating an amplitude noise component from the calculated amplitude component;

calculating a signal-to-noise ratio for each frequency on the basis of a ratio between the calculated amplitude component and the estimated amplitude noise component;

correcting the calculation result of the phase difference at the sampling time on the basis of the calculated signal-to-noise ratio and the calculation results of the phase differences at the past sampling times;

calculating difference between arrival distances of the sound signal from a target sound source on the basis of the calculated phase difference after correction; and estimating direction in which a target sound source is present on the basis of the calculated difference between the arrival distances.

5. The method of estimating sound arrival direction as set forth in claim 4, further comprising the step of specifying a voice section which is a section indicating voice among the accepted sound signal input, wherein, at the step of transforming the signal into the signal on the frequency axis, only the signal in the voice section specified at the step of specifying voice section is transformed into a signal on the frequency axis.

6. A sound arrival direction estimating apparatus for estimating direction in which a sound source of sound signal is present, the sound signal being inputted to sound signal inputting parts which input sound signals from the sound sources present in multiple directions as inputs of multiple channels, comprising:

sound signal accepting part which accepts sound signals of multiple channels inputted by the sound signal inputting parts and converting each signal into a signal on a time axis for each channel;

signal transforming part which transforms the signal on the time axis, converted by the sound signal accepting part, into a signal on a frequency axis for each channel;

phase component calculating part which calculates for each identical frequency a phase component of the signal of each channel on the frequency axis transformed by the signal transforming part;

phase difference calculating part which calculates phase difference between the multiple channels using the phase component of the signal of each channel, calculated for each identical frequency by the phase component calculating part;

amplitude component calculating part which calculates an amplitude component of the signal on the frequency axis transformed by the signal transforming part;

amplitude noise component estimating part which estimates an amplitude noise component from the amplitude component calculated by the amplitude component calculating part;

signal-to-noise ratio calculating part which calculates a signal-to-noise ratio for each frequency on the basis of a ratio between the amplitude component calculated by the amplitude component calculating part and the amplitude noise component estimated by the amplitude noise component estimating part;

frequency extracting part which extracts frequencies at which the signal-to-noise ratios calculated by the signal-to-noise ratio calculating part are larger than a predetermined value;

arrival distance difference calculating part which calculates difference between arrival distances of the sound signal from a target sound source on the basis of the phase difference calculated by the phase difference calculating part of the frequency extracted by the frequency extracting part; and sound arrival direction estimating part which estimates direction in which a target sound source is present on the basis of the difference between the arrival distances calculated by the arrival distance difference calculating part.

7. The sound arrival direction estimating apparatus as set forth in claim 6, wherein the frequency extracting part selects and extracts a predetermined number of frequencies at which the signal-to-noise ratios calculated by the signal-to-noise ratio calculating part are larger than the predetermined value in the decreasing order of the calculated signal-to-noise ratio.

8. The sound arrival direction estimating apparatus as set forth in claim 7, further comprising voice section specifying part which specifies a voice section which is a section indicating voice among a sound signal input accepted by the sound signal accepting part, wherein the signal transforming part transforms only the signal in the voice section specified by the voice section specifying part into a signal on the frequency axis.

9. A sound arrival direction estimating apparatus for estimating direction in which a sound source of sound signal is present, the sound signal being inputted to sound signal inputting parts which input sound signals from the sound sources present in multiple directions as inputs of multiple channels, comprising:

sound signal accepting part which accepts sound signals of multiple channels inputted by the sound signal inputting parts and converting each signal into a sampling signal on a time axis for each channel;

signal transforming part which transforms each sampling signal on the time axis, converted by the sound signal accepting part, into a signal on a frequency axis for each channel;

phase component calculating part which calculates for each identical frequency a phase component of the signal of each channel on the frequency axis transformed by the signal transforming part;

phase difference calculating part which calculates phase difference between the multiple channels using the phase component of the signal of each channel, calculated for each identical frequency by the phase component calculating part;

amplitude component calculating part which calculates an amplitude component of the signal on the frequency axis transformed at a predetermined sampling time by the signal transforming part;

amplitude noise component estimating part which estimates an amplitude noise component from the amplitude component calculated by the amplitude component calculating part;

signal-to-noise ratio calculating part which calculates a signal-to-noise ratio for each frequency on the basis of a ratio between the amplitude component calculated by the amplitude component calculating part and the amplitude noise component estimated by the amplitude noise component estimating part;

correcting part which corrects the calculation result of the phase difference at the sampling time on the basis of the signal-to-noise ratio calculated by the signal-to-noise ratio calculating part and the calculation results of the phase differences at past sampling times;

arrival distance difference calculating part which calculates difference between arrival distances of the sound signal from a target sound source on the basis of the phase difference after corrected by the correcting part; and sound arrival direction estimating part which estimates direction in which a target sound source is present on the basis of the difference between the arrival distances calculated by the arrival distance difference calculating part.

10. The sound arrival direction estimating apparatus as set forth in claim 9, further comprising voice section specifying part which specifies a voice section which is a section indicating voice among a sound signal input accepted by the sound signal accepting part, wherein the signal transforming part transforms only the signal in the voice section specified by the voice section specifying part into a signal on the frequency axis.

11. A sound arrival direction estimating apparatus for estimating direction in which a sound source of sound signal is present, the sound signal being inputted to sound signal inputting units which input sound signals from the sound sources present in multiple directions as inputs of multiple channels, comprising a processor, connected with the sound signal input units, capable of performing the following operations of:

accepting sound signals of multiple channels inputted by the sound signal input units and converting each signal into a signal on a time axis for each channel;

transforming the signal of each channel on the time axis into a signal on a frequency axis;

calculating a phase component of the transformed signal of each channel on the frequency axis for each identical frequency;

calculating phase difference between the multiple channels using the phase component of the signal of each channel, calculated for each identical frequency;

calculating an amplitude component of the transformed signal on the frequency axis;

estimating an amplitude noise component from the calculated amplitude component;

calculating a signal-to-noise ratio for each frequency on the basis of a ratio between the calculated amplitude component and the estimated amplitude noise component;

extracting frequencies at which the signal-to-noise ratios are larger than a predetermined value;

calculating difference between arrival distances of the sound signal from a target sound source on the basis of the calculated phase difference of the extracted frequencies; and estimating direction in which a target sound source is present on the basis of the calculated difference between the arrival distances.

12. The sound arrival direction estimating apparatus as set forth in claim 11, wherein a predetermined number of frequencies at which the signal-to-noise ratios are larger than the predetermined value are selected and extracted in the decreasing order of the calculated signal-to-noise ratio.

13. The sound arrival direction estimating apparatus as set forth in claim 12, wherein the processor further capable of performing the following operations:

specifying a voice section which is a section indicating voice among accepted sound signal input; and transforming only the signal in the specified voice section into a signal on the frequency axis.

14. A sound arrival direction estimating apparatus for estimating direction in which a sound source of sound signal is present, the sound signal being inputted to sound signal inputting units which input sound signals from the sound sources present in multiple directions as inputs of multiple channels, comprising a processor, connected with the sound signal input units, capable of performing the following operations of:

accepting sound signals of multiple channels inputted by the sound signal input units and converting each signal into a sampling signal on a time axis for each channel;

transforming each sampling signal on the time axis into a signal on a frequency axis for each channel;

calculating a phase component of the transformed signal of each channel on the frequency axis for each identical frequency;

calculating phase difference between the multiple channels using the phase component of the signal of each channel, calculated for each identical frequency;

calculating an amplitude component of the signal on the frequency axis transformed at a predetermined sampling time;

estimating an amplitude noise component from the calculated amplitude component;

calculating a signal-to-noise ratio for each frequency on the basis of a ratio between the calculated amplitude component and the estimated amplitude noise component;

correcting the calculation result of the phase difference at the sampling time on the basis of the calculated signal-to-noise ratio and the calculation results of the phase differences at the past sampling times;

calculating difference between arrival distances of the sound signal from a target sound source on the basis of the calculated phase difference after correction; and estimating direction in which a target sound source is present on the basis of the calculated difference between the arrival distances.

15. The sound arrival direction estimating apparatus as set forth in claim 14, wherein the processor further capable of performing the following operations:

specifying a voice section which is a section indicating voice among accepted sound signal input; and transforming only the signal in the specified voice section into a signal on the frequency axis.

16. A computer program product stored on a non-transitory computer readable medium for controlling a computer that is connected to sound signal input units which input sound signals from sound sources present in multiple directions as inputs of multiple channels and that estimates direction in which a sound source of the sound signal inputted to the sound signal input units is present, comprising:

a first module causing the computer to accept the sound signals of multiple channels inputted by the sound signal input units and convert each signal into a signal on a time axis for each channel:

a second module causing the computer to transform the signal of each channel on the time axis into a signal on a frequency axis;

a third module causing the computer to calculate a phase component of the transformed signal of each channel on the frequency axis for each identical frequency;

a fourth module causing the computer to calculate phase difference between the multiple channels using the phase component of the signal of each channel, calculated for each identical frequency;

a fifth module causing the computer to calculate the transformed amplitude component of the signal on the frequency axis;

a sixth module causing the computer to estimate an amplitude noise component from the calculated amplitude component;

a seventh module causing the computer to calculate a signal-to-noise ratio for each frequency on the basis of a ratio between the calculated amplitude component and the estimated amplitude noise component;

an eighth module causing the computer to extract frequencies at which the signal-to-noise ratios are larger than a predetermined value;

a ninth module causing the computer to calculate difference between arrival distances of the sound signal from a target sound source on the basis of the calculated phase difference of the extracted frequencies; and a tenth module causing the computer to estimate the direction in which the target sound source is present on the basis of the calculated difference between the arrival distances.

17. The computer program product as set forth in claim 16, wherein a predetermined number of frequencies at which the signal-to-noise ratios are larger than the predetermined value are selected and extracted in the decreasing order of the calculated signal-to-noise ratio.

18. The computer program product as set forth in claim 17, the computer program product further comprising a module causing the computer to specify a voice section which is a section indicating voice among an accepted sound signal input, wherein only the signal in the specified voice section is transformed into a signal on the frequency axis.

19. A computer program product stored on a non-transitory computer readable medium for controlling a computer that is connected to sound signal input units which input sound signals from sound sources present in multiple directions as inputs of multiple channels and that estimates direction in which a sound source of the sound signal inputted to the sound signal input units is present, comprising:

a first module causing the computer to accept the sound signals of multiple channels inputted by the sound signal input units and convert each signal into a sampling signal on a time axis for each channel:

a second module causing the computer to transform each sampling signal on the time axis into a signal on a frequency axis for each channel;

a third module causing the computer to calculate a phase component of the transformed signal of each channel on the frequency axis for each identical frequency;

a fourth module causing the computer to calculate phase difference between the multiple channels using the phase component of the signal of each channel, calculated for each identical frequency;

a fifth module causing the computer to calculate the amplitude component of the signal on the frequency axis transformed at a predetermined sampling time;

a sixth module causing the computer to estimate an amplitude noise component from the calculated amplitude component;

a seventh module causing the computer to calculate a signal-to-noise ratio for each frequency on the basis of a ratio between the calculated amplitude component and the estimated amplitude noise component;

an eighth module causing the computer to correct the calculation result of the phase difference at the sampling time on the basis of the calculated signal-to-noise ratio and the calculation results of the phase differences at past sampling times;

a ninth module causing the computer to calculate difference between arrival distances of the sound signal from a target sound source on the basis of the calculated phase difference after correction; and a tenth module causing the computer to estimate the direction in which the target sound source is present on the basis of the calculated difference between the arrival distances.

20. The computer program product as set forth in claim 19, the computer program product further comprising a module causing the computer to specify a voice section which is a section indicating voice among an accepted sound signal input, wherein only the signal in the specified voice section is transformed into a signal on the frequency axis.

* * * * *